(12) United States Patent
Okuda et al.

(10) Patent No.: US 10,020,146 B2
(45) Date of Patent: Jul. 10, 2018

(54) CURRENT INTERRUPTION DEVICE AND ELECTRIC STORAGE DEVICE USING SAME

(71) Applicants: KABUSHIKI KAISHA TOYOTA JIDOSHOKKI, Kariya-shi, Aichi-ken (JP); Eagle Industry Co., Ltd., Minato-ku, Tokyo (JP)

(72) Inventors: Motoaki Okuda, Kariya (JP); Satoshi Umemura, Kariya (JP); Takayuki Kato, Kariya (JP); Hiroyasu Nishihara, Kariya (JP); Atsushi Minagata, Kariya (JP); Hirokuni Akiyama, Kariya (JP); Toshio Odagiri, Kariya (JP); Takayuki Hirose, Kariya (JP); Yoshihiro Ogawa, Minato-ku (JP); Toshiaki Iwa, Minato-ku (JP)

(73) Assignees: KABUSHIKI KAISHA TOYOTA JIDOSHOKKI, Aichi (JP); Eagle Industry Co., Ltd., Tokyo (JP)

( * ) Notice: Subject to any disclaimer, the term of this patent is extended or adjusted under 35 U.S.C. 154(b) by 287 days.

(21) Appl. No.: 14/391,983

(22) PCT Filed: Apr. 11, 2013

(86) PCT No.: PCT/JP2013/060968
§ 371 (c)(1),
(2) Date: Oct. 10, 2014

(87) PCT Pub. No.: WO2013/154166
PCT Pub. Date: Oct. 17, 2013

(65) Prior Publication Data
US 2015/0079432 A1    Mar. 19, 2015

(30) Foreign Application Priority Data

Apr. 12, 2012 (JP) ................................ 2012-090630
Apr. 12, 2012 (JP) ................................ 2012-090992

(51) Int. Cl.
H01H 35/26 (2006.01)
H01H 35/34 (2006.01)
(Continued)

(52) U.S. Cl.
CPC ............ *H01H 35/346* (2013.01); *H01G 2/14* (2013.01); *H01G 9/0003* (2013.01); *H01G 9/12* (2013.01);
(Continued)

(58) Field of Classification Search
CPC ........ H01G 11/16; H01G 2/14; H01G 9/0003; H01G 9/12; H01H 35/26; H01H 35/346;
(Continued)

(56) References Cited

U.S. PATENT DOCUMENTS 5,567,539 A * 10/1996 Takahashi ............ H01H 37/323
429/57
5,585,207 A   12/1996 Wakabe et al.
(Continued)

FOREIGN PATENT DOCUMENTS

CA     2099657 C      4/1998
CN     101164182 A    4/2008
(Continued)

OTHER PUBLICATIONS

Communication dated Apr. 12, 2016, from the Japanese Patent Office in counterpart application No. 2014-510200.
(Continued)

Primary Examiner — Sarah A. Slifka
Assistant Examiner — Lilia Nedialkova
(74) Attorney, Agent, or Firm — Sughrue Mion, PLLC

(57) ABSTRACT

A current interruption device includes: a deforming plate configured to deform when the internal pressure of the casing rises above the predetermined level; a conducting plate which configures the current path; and a contact plate.

(Continued)

The conducting plate includes a first contact portion configured to contact the contact plate. The contact plate includes a second contact portion configured to contact the first contact portion. The deforming plate includes a pressure receiving portion configured to receive the internal pressure of the casing and a contacting portion configured to contact the first contact portion. The second contact portion is configured to be separated from the conducting plate by deformation causing the contacting portion to move toward the contact plate. The deforming plate is insulated from the conducting plate and the contact plate. The conducting plate is disposed to be interleaved between the deforming plate and the contact plate.

31 Claims, 31 Drawing Sheets

(51) Int. Cl.
*H01M 2/34* (2006.01)
*H01G 9/12* (2006.01)
*H01M 2/30* (2006.01)
*H01G 2/14* (2006.01)
*H01G 11/16* (2013.01)
*H01G 9/00* (2006.01)

(52) U.S. Cl.
CPC ............ *H01G 11/16* (2013.01); *H01H 35/26* (2013.01); *H01M 2/30* (2013.01); *H01M 2/345* (2013.01); *H01M 2200/20* (2013.01); *Y02E 60/13* (2013.01)

(58) Field of Classification Search
CPC .... H01M 2200/20; H01M 2/30; H01M 2/345; Y02E 60/13
See application file for complete search history.

(56) References Cited

U.S. PATENT DOCUMENTS

| | | | |
|---|---|---|---|
| 5,705,290 A | 1/1998 | Azema | |
| 5,707,756 A | 1/1998 | Inoue et al. | |
| 5,738,690 A * | 4/1998 | Hughett | H01M 2/0202 137/260 |
| 5,766,790 A | 6/1998 | Kameishi et al. | |
| 6,120,928 A | 9/2000 | Azema | |
| 6,136,464 A | 10/2000 | Wakabe et al. | |
| 6,287,718 B1 | 9/2001 | Azema | |
| 6,296,965 B1 | 10/2001 | Azema | |
| 6,342,826 B1 | 1/2002 | Quinn et al. | |
| 6,524,739 B1 | 2/2003 | Iwaizono et al. | |
| 6,555,263 B1 * | 4/2003 | Kim | H01M 2/1241 429/53 |
| 2009/0081530 A1 | 3/2009 | Hashimoto et al. | |
| 2011/0008654 A1 | 1/2011 | Kim et al. | |
| 2011/0052949 A1 * | 3/2011 | Byun | H01M 2/043 429/61 |
| 2011/0206958 A1 | 8/2011 | Kiyama et al. | |
| 2012/0208051 A1 | 8/2012 | Tsukiji et al. | |
| 2012/0231323 A1 * | 9/2012 | Takagi | B32B 5/18 429/144 |

FOREIGN PATENT DOCUMENTS

| | | |
|---|---|---|
| EP | 0739047 A2 | 10/1996 |
| JP | 06-215746 A | 8/1994 |
| JP | 07-245090 A | 9/1995 |
| JP | 07-254401 A | 10/1995 |
| JP | 08-078000 A | 3/1996 |
| JP | 09-055197 A | 2/1997 |
| JP | 09-106803 A | 4/1997 |
| JP | 09-129214 A | 5/1997 |
| JP | 10-233199 A | 9/1998 |
| JP | 10-321213 A | 12/1998 |
| JP | 2000-090911 A | 3/2000 |
| JP | 2000-149918 A | 5/2000 |
| JP | 2000-512062 A | 9/2000 |
| JP | 200184880 A | 3/2001 |
| JP | 2006-252848 A | 9/2006 |
| JP | 2008-171678 A | 7/2008 |
| JP | 2009295565 A | 12/2009 |
| JP | 2010113929 A | 5/2010 |
| JP | 2010-272389 A | 12/2010 |
| JP | 2011204623 A | 10/2011 |
| JP | 2012-506107 A | 3/2012 |
| WO | 97/033334 A1 | 9/1997 |
| WO | 2012/042743 A1 | 4/2012 |

OTHER PUBLICATIONS

Communication dated Oct. 23, 2014 from The International Bureau of WIPO in counterpart International Patent Application No. PCT/JP2013/060968.
International Search Report for PCT/JP2013/060968 dated Jun. 18, 2013.
Written Opinion for PCT/JP2013/060968 dated Jun. 18, 2013.
Communication dated Jun. 24, 2015, issued by the European Patent Office in counterpart Application No. 13775501.3.
Communication dated Nov. 14, 2017 from the European Patent Office in counterpart application No. 13 775 501.3.
Communication dated Mar. 5, 2018, from State Intellectual Property Office of the P.R.C. in counterpart application No. 201610391469.1.

* cited by examiner

CURRENT INTERRUPTION DEVICE AND ELECTRIC STORAGE DEVICE USING SAME

CROSS REFERENCE TO RELATED APPLICATIONS

This application is a National Stage of International Application No. PCT/JP2013/060968 filed Apr. 11, 2013, claiming priority based on Japanese Patent Application Nos. 2012-090992 filed Apr. 12, 2012 and 2012-090630 filed Apr. 12, 2012, the contents of all of which are incorporated herein by reference in their entirety.

TECHNICAL FIELD

The present application claims priority under Japanese Patent Application No. 2012-090992 filed on Apr. 12, 2012 and Japanese Patent Application No. 2012-090630 filed on Apr. 12, 2012, the entire contents of which are incorporated herein by reference. This specification discloses a technology that relates to a current interruption device and an electric storage device using the same.

BACKGROUND ART

Electric storage devices such as lithium-ion batteries, nickel-hydride batteries, and other secondary batteries (storage batteries) are growing in importance as power sources for use in vehicles or power sources for personal computers and portable terminals. In particular, lithium ion batteries are expected to be used as high-output power sources for use in vehicles. Lithium-ion batteries are light in weight but high in energy density. A typical example of a structure of a secondary battery is a sealed-structure battery (sealed battery) in which an electrode assembly and an electrolyte are accommodated in a casing and the casing is sealed.

If such a battery is charged by a charging device with a defect in the battery or with a malfunction in the charging device, an electric current at a level that is higher than a normal level may flow through the battery, as a result of which the battery may be brought into an overcharged condition. If there is an abnormality such as an overcharged condition in the battery, gas may be generated within the sealed casing. A pressure inside the casing may rise to such an extent that a pressure of the gas may cause the battery (casing) to inflate or cause the casing to be damaged. As measures against such defects, there has been proposed a battery including a current interruption device. The current interruption device ensures the safety of the battery by interrupting the electric current when an internal pressure of the sealed casing abnormally rises. Such technologies are disclosed, for example, in Japanese Patent Application Publication No. H6-215746, Japanese Patent Application Publication No. 7-254401, Japanese Patent Application Publication No. H9-129214, and Japanese Patent Application Publication No. H10-233199.

A conventional current interruption device is described with reference to FIGS. 11A and 11B. A current interruption device 50 is provided near a positive electrode of a sealed secondary battery. As shown in FIG. 11A, the current interruption device 50 includes a sealing cover body 52, an inverting plate 53, and a lead attachment plate 54. The sealing cover body 52 has a conduction property, and is connected to an external terminal 51. The inverting plate 53 has a conduction property, and is disposed on an inner side of the sealing cover body 52. The lead attachment plate 54 is has a conduction property, and is disposed on an inner side of the inverting plate 53. The lead attachment plate 54 is made of metal, and adheres to a center portion (contact portion) 56 of the inverting plate 53. The lead attachment plate 54 has an air hole 55 formed therethrough so that an internal pressure of the battery acts on the inverting plate 53. An arrow 57 indicates a current path through which an electric current flows when the battery is in a normal condition. When the battery is in a normal condition, an electric current flows serially to the external terminal 51 through the lead attachment plate 54, the inverting plate 53, and the sealing cover body 52. It should be noted that an outer circumference portion of the lead attachment plate 54 is supported by a supporting member 58. The supporting member 58 is made of an insulating material.

If the battery is brought into an abnormal condition such as an overcharged condition, gas is generated within the sealed casing, with the result that an internal pressure of the casing rises. If the battery is brought into an abnormal condition, the internal pressure of the casing acts on the inverting plate 53 through the air hole 55 of the lead attachment plate 54 as shown in FIG. 11B. An adhering portion at the center portion (contact portion) 56 of the inverting plate 53 breaks, and the inverting plate 53 gets inverted upward. The current path 57 gets broken, and the electric current gets interrupted.

SUMMARY OF INVENTION

In the conventional current interruption device described above, the contact portion 56 between the lead attachment plate 54 and the inverting plate 53 is located in an atmosphere of an electrolytic solution. Therefore, the contact portion 56 may deteriorate due to the electrolytic solution and/or the surrounding environment, with the result that there may be a decrease in reliability of the current interruption device. This specification provides a technology for solving the aforementioned problems. This specification provides a current interruption device in which a decrease in reliability is suppressed by suppressing deterioration in a contact portion.

A current interruption device that is disclosed herein includes the following basic structure and technical features: (1) The current interruption device has its inside sealed from an atmosphere in a casing (i.e. from the outside of the current interruption device); (2) A rise in an internal pressure of the casing causes an deforming plate to be inverted by a pressure difference between the inside of the current interruption device and the outside of the current interruption device; and (3) As mentioned above, the current interruption device has its inside sealed from the atmosphere in the casing. Therefore, even if an arc is generated when a current path breaks, it does not affect the inside of the casing, in which hydrogen gas has been generated. The safety of an electric storage device can be enhanced.

A current interruption device that is disclosed herein is configured to electrically connect a positive electrode external terminal and an electrode assembly including a positive electrode and a negative electrode or to connect a negative electrode external terminal and the electrode assembly. The current interruption device is configured to interrupt a current path of the external terminal (the positive electrode external terminal or the negative electrode external terminal) and the electrode assembly when an internal pressure of a casing accommodating the electrode assembly rises above a predetermined level.

The current interruption device includes: a deforming plate; a conducting plate which configures the current path; and a contact plate. The deforming plate is configured to deform when the internal pressure of the casing rises above the predetermined level. The conducting plate includes a first contact portion configured to contact the contact plate. The contact plate includes a second contact portion configured to contact the first contact portion. The first contact portion and the second contact portion are disposed on the current path. The deforming plate includes a pressure receiving portion configured to receive the internal pressure of the casing and a contacting portion configured to contact at least one of the first contact portion and the second contact portion. In the current interruption device, at least the second contact portion, among the first contact portion and the second contact portion, is configured to be separated from the conducting plate by deformation causing the contacting portion to move toward the contact plate. The deforming plate is insulated from at least one of the conducting plate and the contact plate. Furthermore, the deforming plate is disposed such that the deforming plate configures an outer face of the current interruption device. Further, the conducting plate is disposed to be interleaved between the deforming plate and the contact plate.

In the current interruption device, the deforming plate causes the contact portions between the conducting plate and the contact plate to be isolated from an atmosphere in which an electrolytic solution is present. This makes it possible to prevent the contact portions from deteriorating under the influence of the electrolytic solution and/or the surrounding environment. Further, even if an arc (spark) is generated when the current path breaks, it does not affect the inside of the casing, in which hydrogen gas has been generated. Furthermore, in the current interruption device, the deforming plate is in contact solely with a fixing portion on the outer circumference. Therefore, unlike that of the conventional technology, the deforming plate gets stably actuated by the internal pressure without being subject to the influence of weld strength.

DESCRIPTION OF EMBODIMENTS

Figure 1:
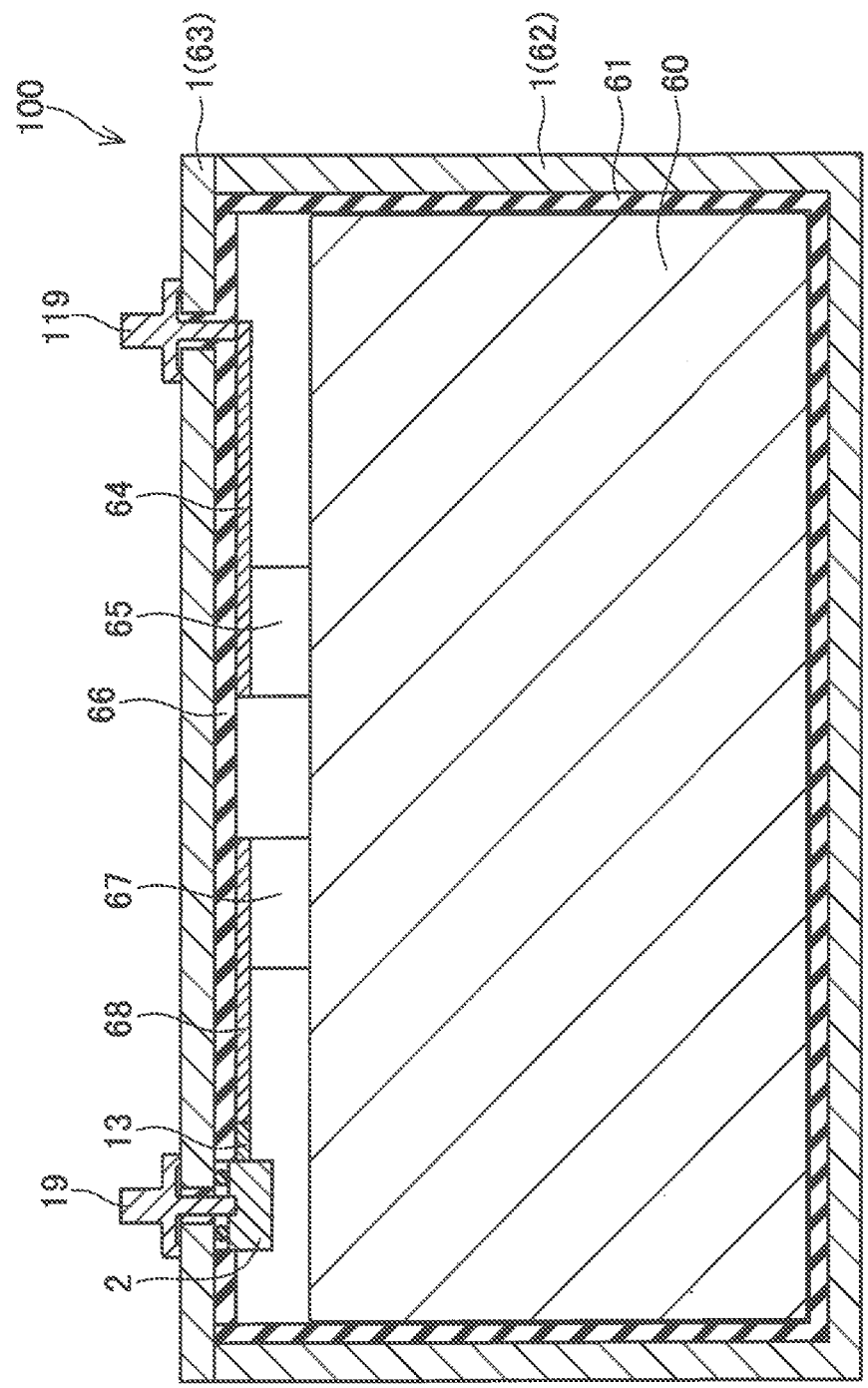
FIG. 1 shows a longitudinal sectional view of an electric storage device of a first embodiment.

Some of the technical features of the embodiments that are disclosed herein are described below. It should be noted that the matters described below each independently have technical utility.

The first contact portion may be disposed at a center portion of the conducting plate, and the second contact portion may be disposed at a center portion of the contact plate. The contacting portion of the deforming plate can be disposed at a center portion of the deforming plate. A portion (center portion) of the deforming plate in which the amount of deformation is large can be utilized for interrupting a current path.

A projection projecting toward the contact plate may be disposed at the center portion of the deforming plate. In this case, the contacting portion may be included in the projection. After breakage of the current path, the projection prevents the conducting plate and the contact plate from making contact again with each other. Further, even if there is a variation in breaking load of the contact portions, the impulsive force of the projection of the deforming plate compensates for the variation in breaking load, so that the current interruption device becomes stable in working pressure.

The deforming plate and the contact plate may be configured by thin plates. The deforming plate and the contact plate can be easily manufactured. Further, actuation of the deforming plate and the contact plate can be stabilized.

The deforming plate may be configured by a thin plate having an arc-shaped wavy portion, and the contact plate may be configured by a flat thin plate. Even in a case where the current interruption device is installed in a space that is narrow on a side extending along the directions in which the deforming plate is displaced, the amount of displacement (stroke) of the deforming plate can be large.

The deforming plate may be configured by a flat thin plate, and the contact plate may be configured by a thin plate having an arc-shaped wavy P7 portion. Even in a case where the contact plate is made of aluminum for higher efficiency of conduction of the contact plate, a spring constant of the contact plate can be lowered. This makes it possible to get the contact plate actuated with a small load.

A groove may be disposed around a center portion of the conducting plate around a portion with which the contacting portion is to make contact. When the deforming plate deforms, the center portion of the conducting plate can be easily broken. This makes it possible to surely break the contact portions between the conducting plate and the contact plate.

A through-hole configured to allow the contacting portion to pass through may be disposed at a center portion of the conducting plate. This makes it possible to more easily break the contact portions between the conducting plate and the contact plate.

A pressure hole configured to exert a pressure change caused by the deformation of the deforming plate on the contact plate may be disposed on the conducting plate. The pressure change caused by the deformation of the deforming plate can be transmitted directly to the contact plate. This makes it possible to even more easily break the contact portions between the conducting plate and the contact plate.

A conductive sealing cover body may be provided so as to cover an outer side of the contact plate, and the sealing cover body may be screw-fixed to the external terminal. This makes it possible to make a connection between the sealing cover body and the external terminal with a simple configuration.

A conductive sealing cover body may be provided so as to cover an outer side of the contact plate, and the sealing cover body may be connected to the external terminal via a connecting member. This makes it possible to place the current interruption device in an electric storage device without screw-fixing the sealing cover body to the external terminal.

The current interruption device may be disposed on the current path formed between the negative electrode external terminal and the electrode assembly. Further, the deforming plate may be made of a same material as the negative electrode. As a material for the deforming plate, a material for the positive electrode (positive electrode collector), namely aluminum or titanium, is not used, but a material for the negative electrode (negative electrode collector), namely a copper-based material (e.g. phosphor bronze) or stainless steel, is used. This makes it possible to enhance the strength of the deforming plate, and also makes it possible to inhibit a creep from occurring in the deforming plate even when there is a rise in temperature or a change in internal pressure inside a cell. This in turn makes it possible to inhibit the deforming plate from deteriorating, prevent the working pressure of the current interruption device from decreasing, and prevent the deforming plate from corroding.

The current interruption device may be configured to switch among the following first condition, second condition and third condition. The first condition is a condition in which a gap is provided between the deforming plate and the conducting plate during when the internal pressure of the casing is below the predetermined level. The second condition is a condition in which the contact plate is separated from the conducting plate by the projection of the deforming plate moving toward the conducting plate and adding an impact to the contact plate when the internal pressure of the case rises above the predetermined level. The third condition is a condition in which a force of the contact plate moving toward the conducting plate and a force of the deforming plate separating the contact plate from the conducting plate are balanced. The current interruption device may be configured such that in the third condition the contact plate is separated from the conducting plate so as not to conduct with the conducting plate. This makes it possible to prevent the electrode assembly and the positive electrode external terminal or the negative electrode external terminal from conducting again with each other after interruption of the current path.

An insulating member having an insulation property may be disposed between the deforming plate and the conducting plate. This makes it possible to prevent the deforming plate and the conducting plate from conducting with each other even when the deforming plate and the conducting plate make contact with each other after interruption of the current path.

A recess may be disposed at a center portion of the conducting plate on a deforming plate side. Further, an area surrounded by the groove of the conducting plate may be recessed toward an opposite side of the deforming plate than a surface positioned at an outer side of the groove of the conducting plate. This makes it possible to easily break the center portion of the conducting plate, and make it possible to surely interrupt the current path.

A fragile portion may be disposed around the second contact portion of the contact plate, the fragile portion being more fragile than other portions of the contact plate. When the contact plate is deformed, the contact plate can be plastically deformed. Alternatively, when the contact plate is deformed, the contact plate gets broken. This makes it possible to inhibit the contact plate from moving toward the conducting plate after interruption of the current path. This in turn makes it possible to prevent the contact plate and the conducting plate from conducting again with each other.

In a case where the contact plate is provided with the fragile portion, an interspacing portion may be disposed between an outer circumference portion of the contact plate and the second contact portion, a distance from the interspacing portion to the conducting plate being increased from the outer circumference portion toward a center portion of the contact plate. In this case, the fragile portion may be provided on the interspacing portion.

The groove of the conducting plate may surround an entire periphery of a portion with which the contacting portion makes contact. Further, an area surrounded by the groove may be recessed relative to a surface of the conducting plate on an outer side of the groove. This makes it possible to increase the distance between the contact plate and the conducting plate. This in turn makes it possible to further prevent the contact plate and the conducting plate from conducting again with each other.

A periphery of the first contact portion on a surface of the conducting plate on a contact plate side may be recessed. Even in such a form, the distance between the contact plate and the conducting plate can be increased. This makes it possible to prevent the contact plate and the conducting plate from conducting again with each other.

The current interruption device may include an insulating cap covering a projection. This expands options of which material to use for the projection. Furthermore, the cap makes it possible to adjust the length of projection of the projection from the deforming plate.

The cap may include a guide portion that is supported with an outer circumference portion of the conducting plate. This makes it possible to prevent the cap from coming off the projection. Alternatively, in a case where the projection is not fixed to the deforming plate, the guide portion makes it possible to position the projection with respect to the deforming plate.

In a case where the current interruption device includes the cap, the groove of the conducting plate may surround an entire periphery of a portion with which the contacting portion makes contact. In this case, an area surrounded by the groove may be recessed relative to a surface of the conducting plate on an outer side of the groove. This makes it possible to prevent the cap from coming off the projection due to the impact of the projection coming into contact with the conducting plate.

EMBODIMENTS

Embodiments of current interruption devices and electric storage devices that are disclosed herein are described below. It should be noted that in the electric storage devices that are disclosed herein, various components can be used other than the current interruption devices. Further, the electric storage devices that are described below can be mounted on vehicles to supply electric power to motors.

Examples of electric storage devices include sealed secondary batteries, sealed capacitors, etc. Examples of secondary batteries include types of comparatively high-capacity batteries that are charged and discharged with large electric currents, such as lithium-ion batteries, nickel-hydride batteries, nickel-cadmium batteries, and lead storage batteries. It should be noted that examples of electrode assemblies of secondary batteries include: laminated electrode assemblies each having a plurality of cells joined on top of each other, the cells each having a pair of electrodes (a positive electrode and a negative electrode) opposed to each other with a separator interleaved therebetween; and wound electrode assemblies each having a sheet-like cell processed into a spiral form, the cell having a pair of electrodes opposed to each other with a separator interleaved therebetween. It should be noted that the following describes an electric storage device in which both a positive electrode external terminal and a negative electrode external terminal are exposed on one side of a casing. However, the technology that is disclosed herein can be applied to a type of electric storage device and the like, such as a cylindrical battery, in which a casing functions as a terminal having one of the two polarities (e.g. a negative electrode) and a terminal of the other of the two polarities (e.g. a positive electrode) is fixed to the casing in a state of insulation from the casing.

First Embodiment

As shown in FIG. 1, an electric storage device 100 includes a casing 1, an electrode assembly 60, a negative electrode external terminal 19, a positive electrode external terminal 119, and a current interruption device 2. The casing 1 includes a main body portion 62 and a cover portion 63. The main body portion 62 is in the shape of a rectangular box. The cover portion 63 is in the shape of a rectangular flat plate, and is configured to close the main body portion 62. The main body portion 62 and the cover portion 63 are made of metal (e.g. stainless steel or aluminum). In the following description, the main body portion 62 and the cover portion 63 may sometimes be referred to simply as "casing 1". Accommodated inside the casing 1 is the electrode assembly 60, which includes a positive electrode and a negative electrode. The casing 1 and the electrode assembly 60 are insulated from each other by an insulating sheet 61. A positive electrode collector tab 65 is fixed to the positive electrode. A negative electrode collector tab 67 is fixed to the negative electrode.

The negative electrode external terminal 19 and the positive electrode external terminal 119 are fixed to the casing 1 (cover portion 63). Although not illustrated, the negative electrode external terminal 19 and the positive electrode external terminal 119 are each insulated from the casing 1 by an insulating sheet or the like. The negative electrode external terminal 19 is electrically connected to the negative electrode collector tab 67 (negative electrode) via the current interruption device 2 and a negative electrode lead 68. The current interruption device 2 will be described in detail later. It should be noted that the current interruption device 2 and the negative electrode lead 68 are connected to each other via a connecting member 13 having a conduction property. The positive electrode external terminal 119 is electrically connected to the positive electrode collector tab 65 (positive electrode) via a positive electrode lead 64. The negative electrode lead 68 and the positive electrode lead 64 are insulated from the casing 1 by an insulating sheet 66 attached to the casing 1 (cover portion 63).

Figure 2A:
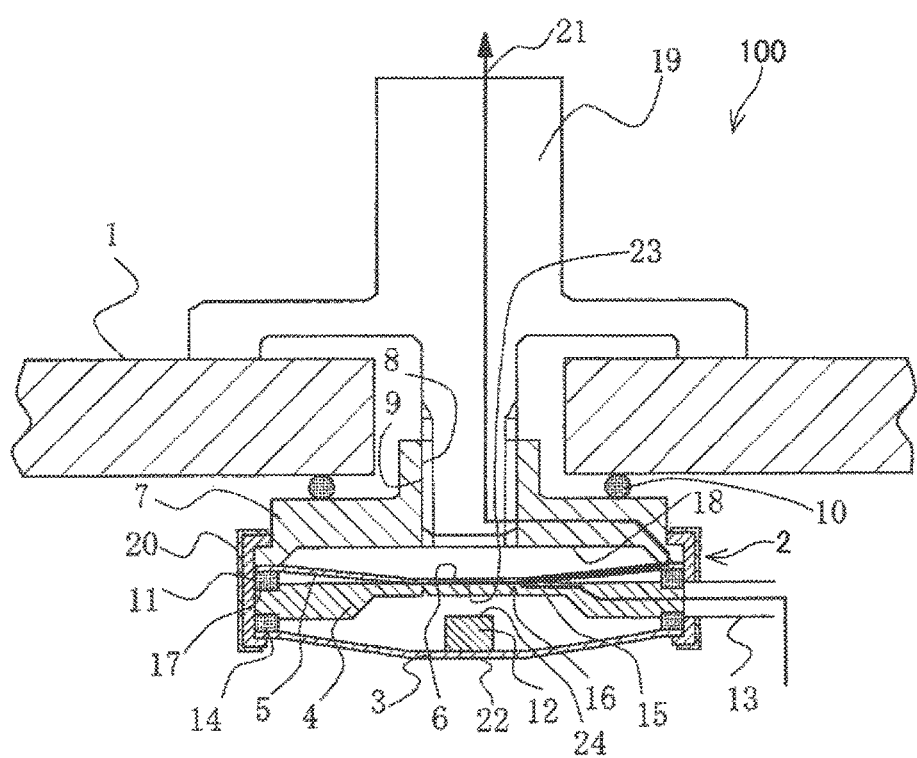
FIG. 2A shows a condition at normal times of a current interruption device of the electric storage device of the first embodiment.
Figure 2B:
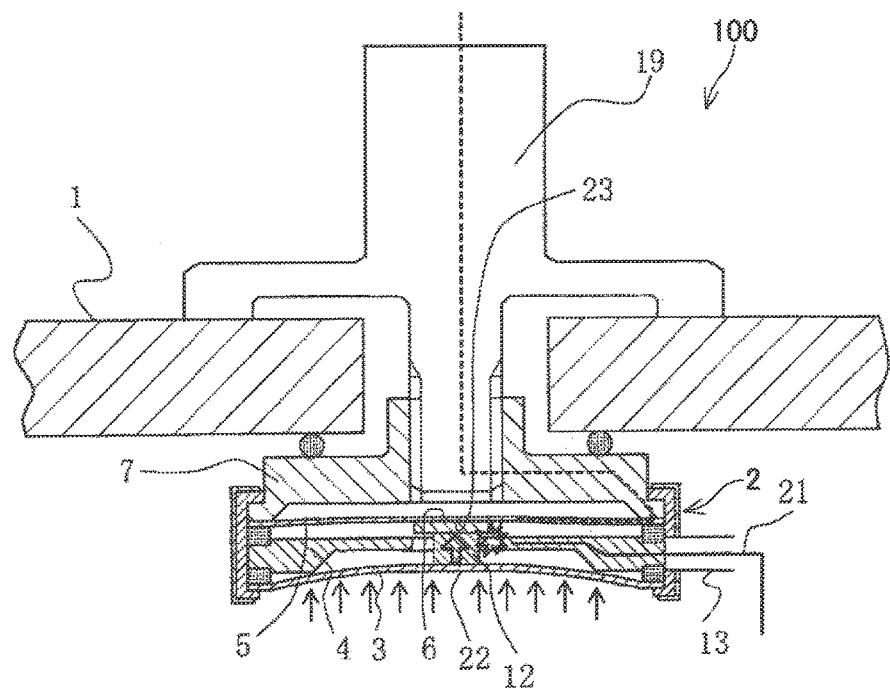
FIG. 2B shows a condition in which a current path is broken in the current interruption device of the electric storage device of the first embodiment.

The current interruption device 2 is described with reference to FIG. 2A and FIG. 2B. It should be noted that FIGS. 2A and 2B omit to illustrate the electrode assembly 60 (see FIG. 1) including the positive electrode and the negative electrode. The electrode assembly 60 is disposed in the lower part of each of FIGS. 2A and 2B. The current interruption device 2 is configured to electrically connect the negative electrode external terminal 19 and the electrode assembly 60. The current interruption device 2 is configured to block circulation of gas between the inside of the casing 1 accommodating the electrode assembly 60 and the outside of the casing 1. The current interruption device 2 is configured to interrupt a serial current path of the negative electrode external terminal 19 and the electrode assembly 60 when an internal pressure of the casing 1 rises above a predetermined level. It should be noted that FIGS. 2A and 2B omit to illustrate the insulating sheet 66 interleaved between the negative electrode external terminal 19 and the casing 1.

An "internal pressure at a predetermined level" means an internal pressure of the casing 1 at a point in time where the electric storage device 100 is brought into an overcharged (overvoltage) condition or where the electric storage device 100 is brought into an overheated condition (thermal runaway temperature of an active material). The "internal pressure at the predetermined level" is set according to conditions such as the capacity, output voltage, etc. of the electric storage device 100. It should be noted that in the electric storage device 100, the current interruption device 2 is disposed below the negative electrode external terminal 19. However, the place where the current interruption device 2 is disposed is not to be limited to one below the negative electrode external terminal 19. The current interruption device 2 needs only be disposed on the serial current path of the negative electrode external terminal 19 and the electrode assembly 60.

The current interruption device 2 is disposed inside the case 1 of the electric storage device 100, and is sealed so that gas in the casing 1 (outside the current interruption device 2) does not circulate into the current interruption device 2. A structure of the current interruption device 2 is described in order from the inside of the casing 1 of the electric storage device 100 (in the lower part of FIG. 2A) toward the outside of the case 1 (in the upper part of FIG. 2A). The current interruption device 2 includes: a deforming plate 3 having a pressure receiving portion 22; a conducting plate 4; a first contact potion 6; a second contact portion 23; and a contact plate 5. The deforming plate 3 is deformable, and is configured to block circulation of gas. The pressure receiving portion 22 of the deforming plate 3 is configured to receive the internal pressure of the casing 1. The conducting plate 4 is electrically connected to the electrode assembly 60. The first contact portion 6 is formed on the conducting plate 4. The first contact portion 6 is formed closer to the center of the conducting plate 4 than a breakable groove 16 of the conducting plate 4. The second contact portion 23 is formed on the conductive contact plate 5. The second contact portion 23 is in contact with the first contact portion 6. The deforming plate 3 is disposed in an outer portion of the current interruption device 2 to form an outer face of the current interruption device 2. The conducting plate 4 and the contact plate 5 are each disposed in an inner side of the deforming plate 3.

In the current interruption device 2, a side opposite (in the lower part of FIG. 2A) to a side of the first contact portion 6 provided on the conducting plate 4 that makes contact with the second contact portion 23 is contactable with the deforming plate 3. Further, the breakable groove 16 is formed around a portion of the conducting plate 4 with which the deforming plate 3 is to make contact. Breaking of the portion of the conducting plate 4 in which the breakable groove 16 is disposed allows the first contact portion 6 to be separated from the conducting plate 4. In the current interruption device 2, the deforming plate 3 causes the contact portions 6 and 23 between the conducting plate 4 and the contact plate 5 to be isolated from an atmosphere in which electrolytic solution is present. This prevents the contact portions 6 and 23 from deteriorating due to the electrolytic solution and/or the surrounding environment. Further, even if an arc (spark) is generated when the current path breaks, it does not affect the inside of the casing 1 of the electric storage device 100, in which hydrogen gas has been generated.

A conductive sealing cover body 7 is provided on the upper side of the contact plate 5 (that faces the negative electrode external terminal 19). The sealing cover body 7 has a female screw portion 8 screw-fixed to a male screw portion 9 of the negative electrode external terminal 19 fixed to the casing 1. A seal member 10 is placed between an upper surface of the sealing cover body 7 and an inner surface of the casing 1. The sealing cover body 7 and the casing 1 are electrically insulated from each other by the seal member 10, The deforming plate 3 is formed by a thin plate. Specifically, the deforming plate 3 is a diaphragm made of metal. An outer circumference portion of the deforming plate 3 is fixed by an insulating supporting member 11. Further, the outer circumference portion the deforming plate 3 is sealed by a seal member 14. A projection 12 projecting toward the contact plate 5 is disposed at a center portion of the deforming plate 3. The shape of the projection 12 is, for example, a cylindrical shape.

When the internal pressure of the casing 1 rises above the predetermined level, the rise in the internal pressure of the casing 1 causes the deforming plate 3 to deform toward the outside (upper side) of the casing 1. A contacting portion 24 of the projection 12 makes contact with the first contact portion 6 to give an impact to the contact portions 6 and 23 between the conducting plate 4 and the contact plate 5, with the result that the first contact portion 6 and the second contact portion 23 are separated from the conducting plate 4. When caused by the rise in the internal pressure of the casing 1 to deform toward the outside of the casing 1, the deforming plate 3 deforms beyond a supporting point on the outer circumference portion of the deforming plate 3, and gets inverted. When the current interruption device 2 is assembled or when the internal pressure of the casing 1 is normal (at or below the predetermined level), the deforming plate 3 is kept protruding toward the inside (lower side) of the casing 1. The inversion of the deforming plate 3 makes it possible to sufficiently ensure the amount of displacement (stroke) by which the deforming plate 3 deforms.

The conducting plate 4 includes the connecting member 13 electrically connected to the electrode assembly 60 (see FIG. 1). The connecting member 13 is provided at one end of an outer circumference of the conducting plate 4. The connecting member 13 is electrically connected to the negative electrode lead 68 fixed to the negative electrode collector tab 67. An outer circumference portion of the conducting plate 4 in which the connecting member 13 is not provided is supported by the insulating supporting member 11. The outer circumference portion of the conducting plate 4 is held by the supporting member 11 at a predetermined distance from the deforming plate 3 with the seal member 14 interleaved therebetween. It should be noted that the "predetermined distance" is such a distance that a dielectric breakdown does not occur in a case where a vehicle load (voltage) is applied between the deforming plate 3 and the conducting plate 4 after actuation of the current interruption device.

A center portion 15 of the conducting plate 4 is thinner than other portions of the conducting plate 4. Specifically, a recess is disposed at a center of the conducting plate 4 on a deforming plate 3 side. The contacting portion 24 of the projection 12 of the deforming plate 3 has contact with the thin portion (center portion 15) of the conducting plate 4. That is, the contacting portion 24 has contact with the first contact portion 6 of the conducting plate 4. The conducting plate 4 is provided with the breakable groove 16. The breakable groove 16 is disposed around a portion with which the contacting portion 24 is to make contact. Therefore, when the contacting portion 24 makes contact with the first contact portion 6, the conducting plate 4 is easily broken by the impact of the contact. When seen in plan view, the breakable groove 16 appears to be disposed closer to the outside than an outer circumference of the contacting portion 24. It should be noted that the breakable groove 16 may be continuous or discontinuous. That is, the breakable groove 16 may surround an entire periphery of the contacting portion 24 or may be provided so as to partially surround the contacting portion 24. Further, the breakable groove 16 is not limited to the shape shown in FIG. 2A, and needs only be shaped such the conducting plate 4 is locally thin.

The contact plate 5 is formed by a conductive flat thin plate. An example of the contact plate 5 is a metal diaphragm having a conduction property. An outer circumference portion of the contact plate 5 is fixed by the insulating supporting member 11. A center portion of the contact plate 5 configures the second contact portion 23 having contact with the conducting plate 4. The contact portions 6 and 23 may simply be in a condition in which the center portion of the conducting plate 4 and the center portion of the contact plate 5 are in contact with each other. Alternatively, the contact portions 6 and 23 may make contact with each other by adhesion such as welding between the center portion of the conducting plate 4 and the center portion of the contact plate 5. An insulating seal member 17 is disposed between the outer circumference portion of the contact plate 5 and the outer circumference portion of the conducting plate 4. Therefore, the outer circumference portion of the contact plate 5 and the outer circumference portion of the conducting plate 4 are electrically insulated from each other. The seal member 17 is configured to seal between the contact plate 5 and the conducting plate 4, and is configured to seal between a space between the contact plate 5 and the conducting plate 4 and the supporting member 11. This makes it possible to surely prevent the electrolytic solution from making contact with the first contact portion and the second contact portion.

An outer circumference portion of the sealing cover body 7 is supported by the insulating supporting member 11. The outer circumference portion of the sealing cover body 7 is in contact with the contact plate 5, and electrically conducts with the contact plate 5. In an inner surface of the sealing cover body 7 (that faces the contact plate 5), a depressed portion 18 recessed upward (away from the contact plate 5) is disposed. Specifically, a center portion of the sealing cover body 7 is more recessed upward than the outer circumference portion of the sealing cover body 7 (that is in contact with the contact plate 5). When the projection 12 of the deforming plate 3 makes contact with the conducting plate 4, the contact plate 5 is deformed upward. The depressed portion 18 is a space in which to cause the contact plate 5 to be deformed upward.

The supporting member 11 has an insulation property, and is shaped, for example, by a resin mold. When seen in plan view, the supporting member 11 appears to be in the shape of a ring. The supporting member 11 has a substantially U-shaped cross-section. In this substantially U-shaped portion, the outer circumference portion of the deforming plate 3, the seal member 14, the outer circumference portion of the conducting plate 4, the insulating seal member 17, and the outer circumference portion of the sealing cover body 7 are located. Further, this substantially U-shaped portion causes the deforming plate 3, the seal member 14, the conducting plate 4, the seal member 17, the contact plate 5, and the sealing cover body 7 to be held in an integrated manner. An outer surface of the supporting member 11 is covered with a caulking member 20 made of metal. The caulking member 20 causes the aforementioned members to be surely held. Further, the caulking member 20 causes the inside of the current interruption device 2 to be sealed.

Now, the current part is described. An arrow 21 indicates the current path from the electrode assembly 60 to the negative electrode external terminal 19. As described above, the connecting member 13 of the conducting plate 4 is electrically connected to the electrode assembly 60 (see FIG. 1) disposed inside the casing 1. At the center portion of the conducting plate 4, the first contact portion 6 that makes contact with the contact plate 5 is disposed. Further, at the center portion of the contact plate 5, the second contact portion 23 that makes contact with the conducting plate 4 is disposed. Furthermore, the outer circumference portion of the contact plate 5 is electrically connected to the sealing cover body 7. This forms the serial current path that extends from the electrode assembly 60 to the negative electrode external terminal 19.

For example, when the electric storage device 100 is overcharged, gas is generated within the sealed casing 1 and the internal pressure of the casing 1 rises. In this case, as shown in FIG. 2B, the internal pressure of the casing 1 acts on the deforming plate 3, and the deforming plate 3 deforms (gets inverted) upward. When the deforming plate 3 deforms upward, the projection 12 collides with the conducting plate 4, and the conducting plate 4 gets broken starting from the breakable groove 16. The first contact portion 6 of the conducting plate 4 and the second contact portion 23 of the contact plate 5 are separated from the conducting plate 4. The contact plate 5 is in an inversion condition or in a condition in which it was before it was joined to the conducting plate 4. As a result, the current path 21 gets broken, and the electric current gets interrupted. That is, the conduction between the negative electrode external terminal 19 and the electrode assembly 60 gets interrupted. In other words, the flow of the electric current through the electric storage device 100 gets interrupted.

After breakage of the current path 21, the projection 12 prevents the conducting plate 4 and the contact plate 5 from making contact again with each other. It should be noted that the deforming plate 3 is not in contact with any other component, except that the outer circumference portion of the deforming plate 3 is fixed to the supporting member 11. Therefore, the deforming plate 3 is stably actuated by the internal pressure of the casing 1. Further, when the projection 12 of the deforming plate 3 collides with the conducting plate 4, the impulsive force is applied to the conducting plate 4. Therefore, even if there is a variation in breaking load of the contact portions 6 and 23, the variation in breaking load can be compensated for. The internal pressure of the casing 1 at which the current interruption device gets driven, i.e. the internal pressure of the casing 1 at which the electric current gets interrupted, can be stabilized.

The foregoing embodiment has been described by taking, as an example, a case where the projection 12 projecting toward the contact plate 5 is disposed at the center portion of the insulating deforming plate 3. In this case, the seal member 14 does not need to have an insulation property. However, in a case where the seal member 14 is made of an insulating material (e.g. rubber), the deforming plate 3 and the projection 12 make be made of a conductive material such as metal. Instead of the insulating projection 12 being disposed at the center portion of the deforming plate 3, the deforming plate 3 may be made entirely of an insulating material. Alternatively, only portions of the projection 12 that make contact with the contact plate 5 and the conducting plate 4 may be made of an insulating material. Alternatively, the projection 12 may be covered with an insulating coating.

What is critical is that when the internal pressure of the casing 1 rises and the deforming plate 3 deforms upward, an impact is added to the contact portions 6 and 23 and the contact portions 6 and 23 are separated from the conducting plate 4, and that the contact plate 5 and the conducting plate 4 are kept electrically insulated from each other after breakage of the current path. The same applies to the embodiments described below.

Second Embodiment

Figure 3A:
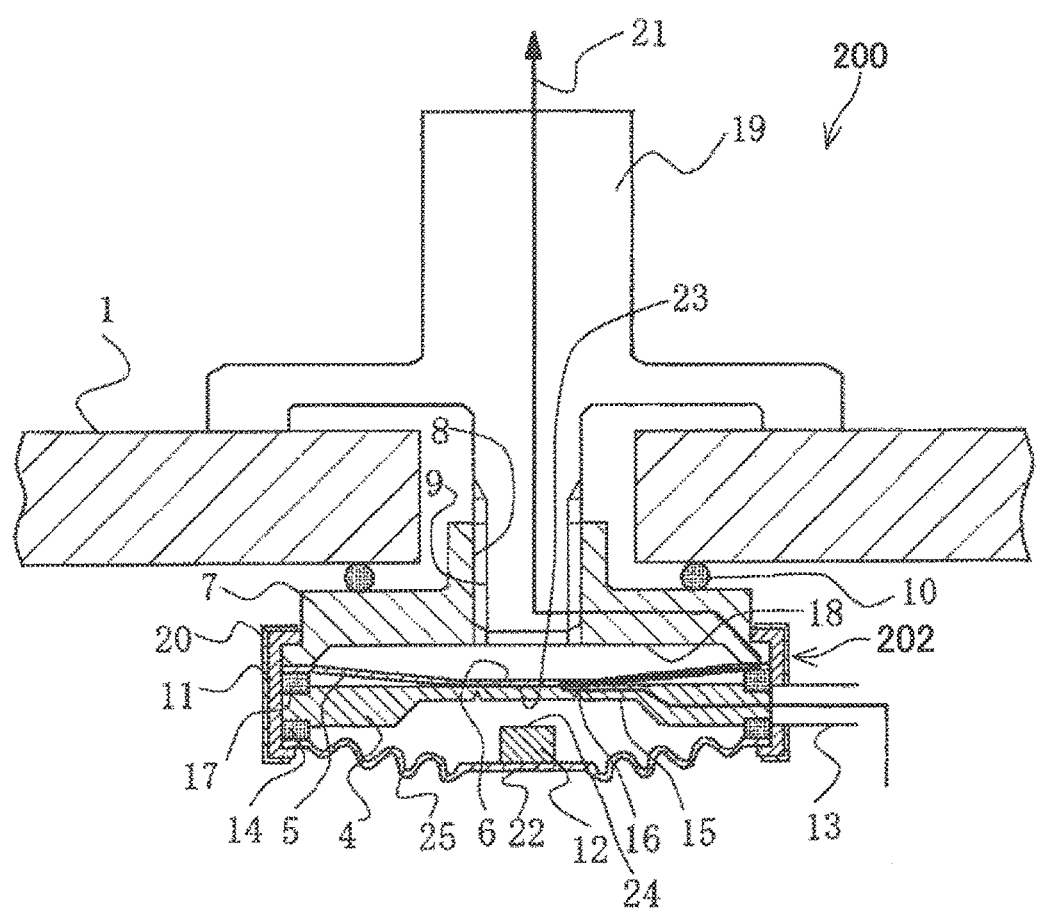
FIG. 3A shows a condition at normal times of a current interruption device of an electric storage device of a second embodiment.
Figure 3B:
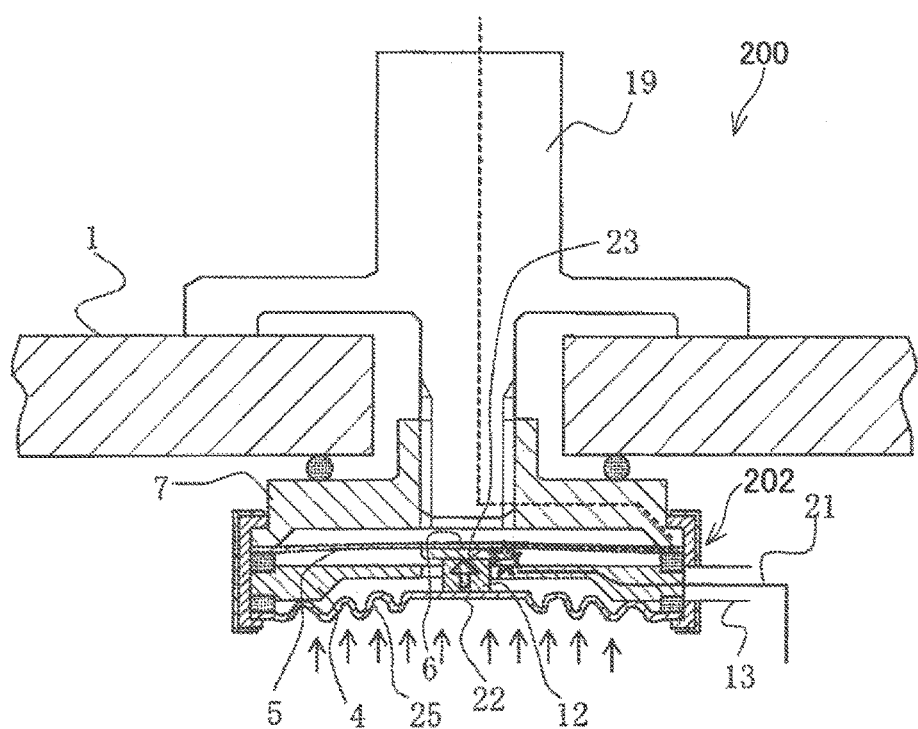
FIG. 3B shows a condition in which a current path is broken in the current interruption device of the electric storage device of the second embodiment.

An electric storage device 200 is described with reference to FIGS. 3A and 3B. The electric storage device 200 is a modification of the electric storage device 100, and a current interruption device 202 differs in structure from the current interruption device 2 of the electric storage device 100. Members of the electric storage device 200 that are the same as those of the electric storage device 100 are given the same reference signs as those of the electric storage device 100, and as such, may not be described. FIG. 3A shows a condition prior to breakage of a current path, and FIG. 3B shows a condition subsequent to breakage of the current path. It should be noted that the following embodiments may omit to illustrate the entire electric storage devices and may illustrate only the structures of the current interruption devices and the areas therearound.

In the current interruption device 202, a deforming plate 25 is configured by a thin plate having an arc-shaped wavy portion. The pressure receiving portion 22 is flat. The wavy portion is provided in a deforming portion between a center portion (pressure receiving portion 22) and an outer circumference portion.

It is preferable that the distance between the conduction plate 4 and the contact portions 6 and 23 be great after breakage of the conducting plate 4. In a case where the deforming plate is flat, it is necessary, for a greater distance between the conduction plate 4 and the contact portions 6 and 23, that the deforming plate be greatly projecting toward the electrode assembly 60 before the deforming plate deforms (when the internal pressure of the casing 1 is normal). However, when the current interruption device is installed in a small space, the deforming plate cannot be made to greatly protrude toward the electrode assembly 60. This causes the amount of displacement (stroke) of the deforming plate to become smaller when the deforming plate gets inverted. This reduces the distance between the conduction plate 4 and the contact portions 6 and 23, thus making it impossible to sufficiently ensure the reliability of the current interruption device (with which to prevent the current path from conducting again).

In the current interruption device 202, the deforming plate 25 is provided with the wavy portion. This makes it possible to sufficiently ensure the amount of displacement of the deforming plate 25 even when the current interruption device 202 is installed in a space that is small on a side extending along the directions in which the deforming plate 25 is displaced (upward and downward directions in FIGS. 3A and 3B). That is, the amount of displacement of the deforming plate 25 in the directions in which the deforming plate 25 is displaced can be increased, and accordingly, the stroke of the deforming plate 25 can be long. It should be noted that in the case of the deforming plate 25 provided with the wavy portion, the current interruption device 202 may be structured such that the deforming plate 25 is inverted or may be structured such that the deforming plate 25 is not inverted. In the case of the deforming plate 25 that is not inverted, it is preferable that the current interruption device 202 be structured such that the contact plate 5 is inverted.

Third Embodiment

Figure 4A:
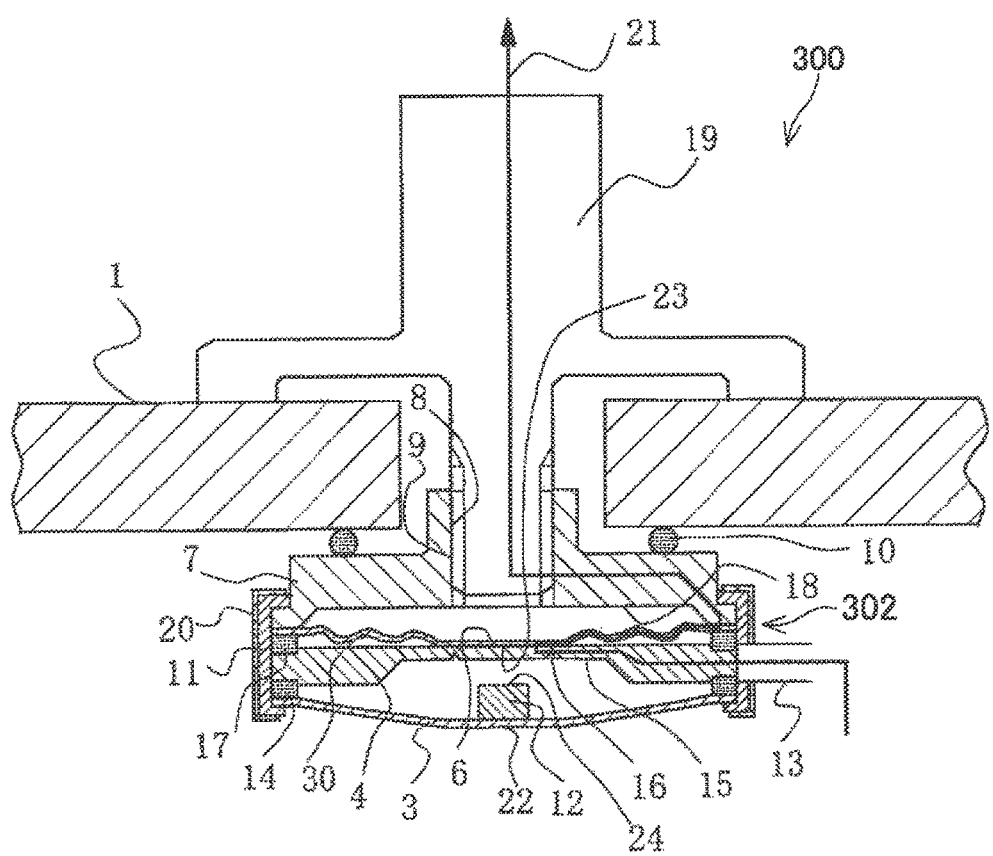
FIG. 4A shows a condition at normal times of a current interruption device of an electric storage device of a third embodiment.
Figure 4B:
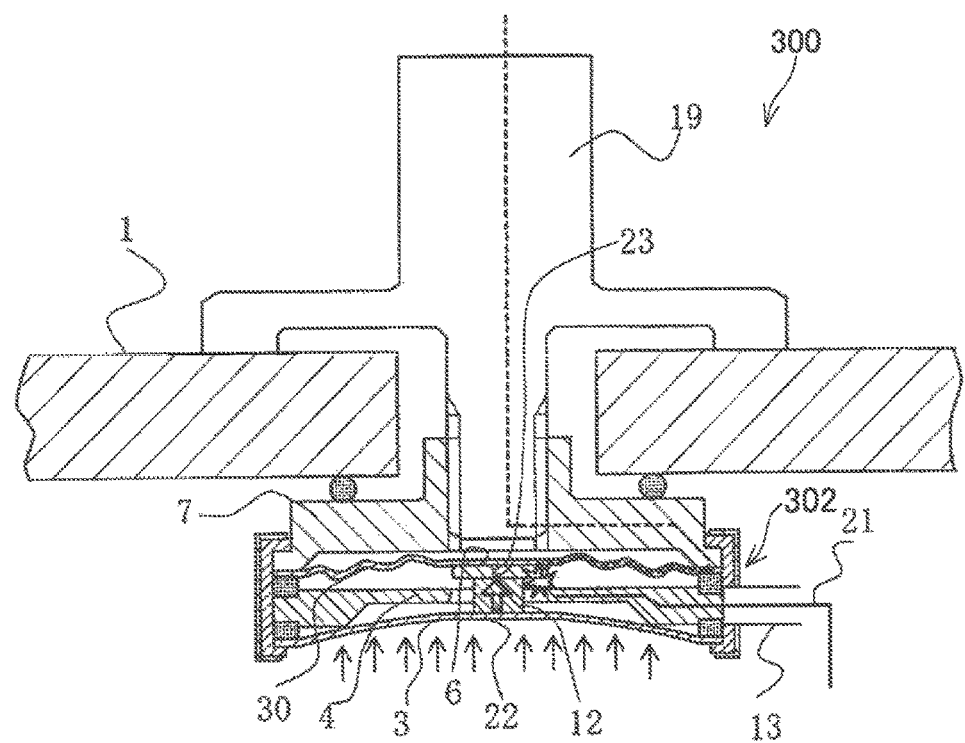
FIG. 4B shows a condition in which a current path is broken in the current interruption device of the electric storage device of the third embodiment.

An electric storage device 300 is described with reference to FIGS. 4A and 4B. The electric storage device 300 is a modification of the electric storage device 100, and a current interruption device 302 differs in structure from the current interruption device 2 of the electric storage device 100. Members of the electric storage device 300 that are the same as those of the electric storage device 100 are given the same reference signs as those of the electric storage device 100, and as such, may not be described. FIG. 4A shows a condition prior to breakage of a current path, and FIG. 4B shows a condition subsequent to breakage of the current path.

In the current interruption device 302, a contact plate 30 is configured by a thin plate having an arc-shaped wavy portion. The contact plate 30 configures a current path of the electric storage device 300. For improvement in efficiency in conduction of the electric storage device 300, it is preferable that the contact plate be made of a material that is low in electric resistance, such as aluminum. However, a material such as aluminum is low in spring property. Therefore, in the case of a structure in which the contact plate is inverted, design for realization of an inversion structure is difficult. When the contact plate 30 includes a wavy portion, as in the current interruption device 302, a spring constant of the contact plate 30 can be lowered. This makes it possible to move or hold the contact plate 30 with a small load. Therefore, by the contact plate 30 having a wavy portion, the contact plate 30 can fulfil a function as a contact plate without getting inverted. It should be noted that it is possible to provide the deforming plate 3 with a wavy portion in addition to providing the contact plate 30 with a wavy portion.

Fourth Embodiment

Figure 5A:
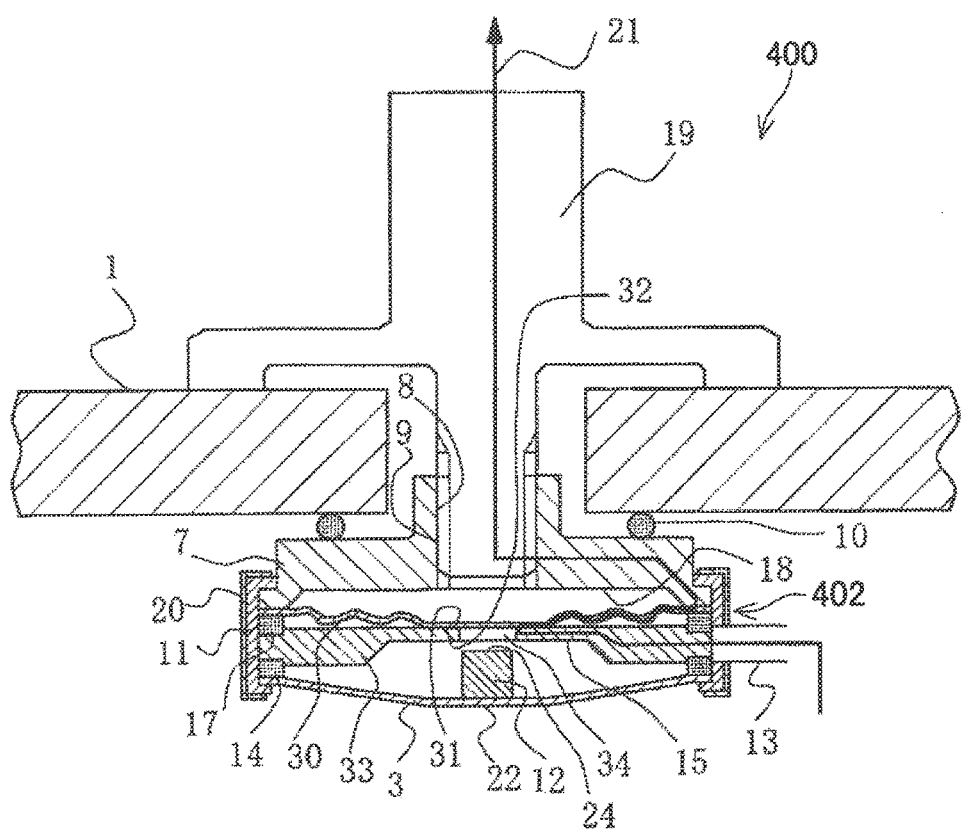
FIG. 5A shows a condition at normal times of a current interruption device of an electric storage device of a fourth embodiment.
Figure 5B:
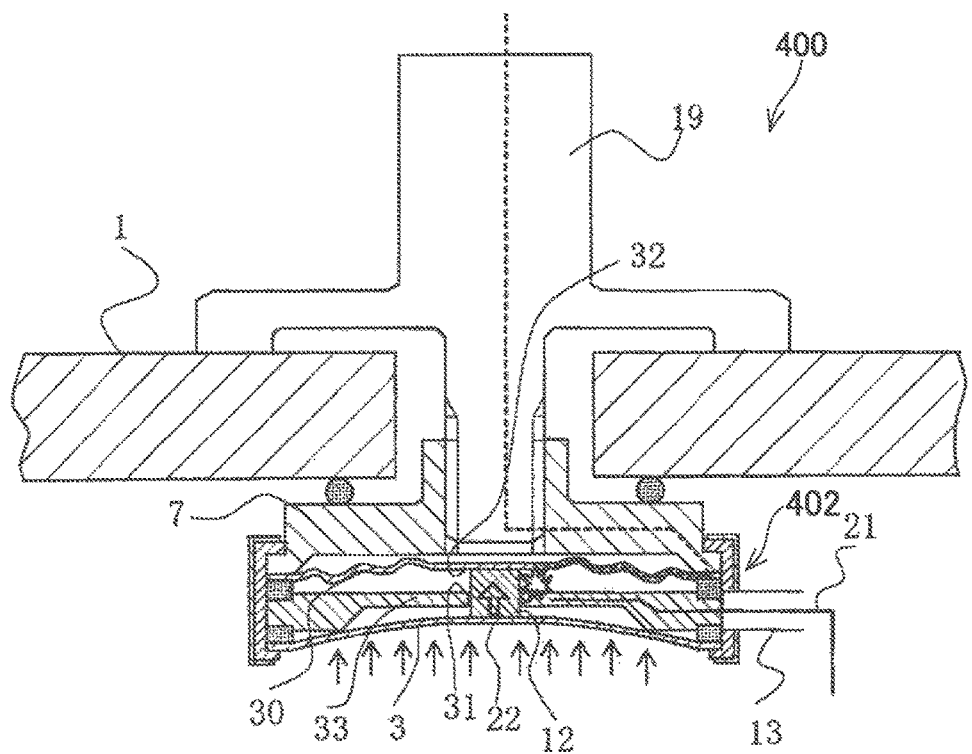
FIG. 5B shows a condition in which a current path is broken in the current interruption device of the electric storage device of the fourth embodiment.

An electric storage device 400 is described with reference to FIGS. 5A and 5B. The electric storage device 400 is a modification of the electric storage device 300, and a current interruption device 402 differs in structure from the current interruption device 302 of the electric storage device 300. Members of the electric storage device 400 that are the same as those of the electric storage device 300 are given the same reference signs as those of the electric storage device 300, and as such, may not be described, FIG. 5A shows a condition prior to breakage of a current path, and FIG. 5B shows a condition subsequent to breakage of the current path.

In the current interruption device 402, a conducting plate 33 differs in shape from the conducting plate 4 of the current interruption device 302. Specifically, whereas the conducting plate 4 is provided with the breakable groove 16, the conducting plate 33 is provided with a through-hole 34. That is, the conducting plate 33 is not provided with a breakable groove. The through-hole 34 is disposed at a center portion of the conducting plate 33. The through-hole 34 is configured to allow the projection 12 to pass through. It should be noted that a contact portion 32 of the contact plate 30 is disposed around the through-hole 34. That is, when seen in plan view, the contact portion 32 appears to be disposed on an outer side of the through-hole 34.

Since the through-hole 34 is disposed in the conducting plate 33, deformation of the deforming plate 3 (see FIG. 5B) causes the projection 12 to pass through the through-hole 34 to directly hit the contact plate 30. The hitting of the contact portion 30 by the projection 12 causes a first contact portion 31 of the conducting plate 33 and the second contact portion 32 of the contact plate 30 to be separated from each other. Since the projection 12 directly collides with the contact plate 30, the first contact portion 31 of the conducting plate 33 and the second contact portion 32 of the contact plate 30 can be more easily broken.

In the current interruption device 402, the deforming plate 3 and the conducting plate 33 are insulated from each other after the first contact portion 31 and the second contact portion 32 are separated from each other. It should be noted that as a configuration to insulate the deforming plate 3 and the conducting plate 33 from each other, the deforming plate 3 per se may be configured by an insulating material or the projection 12 may be configured by an insulating material. Alternatively, an inner circumference portion of the through-hole 34 may be covered with an insulating coating. Further, in a case where the deforming plate 3, the projection 12, and the inner circumference portion of the through-hole 34 are all conductive, the deforming plate 3 and the conducting plate 33 may be insulated from each other by configuring the projection 12 and the conducting plate 33 not to make contact with each other and configuring the deforming plate 3 and the conducting plate 33 not to make contact with each other.

It should be noted that the projection 12 may be fitted in the through-hole 34. Since the deforming plate 3 can be prevented from returning to the condition (see FIG. 5A) in which it was before the current path was broken, the first contact portion 31 and the second contact portion 32 can be kept separated from each other. Further, the configuration disclosed in the present embodiment in which the through-hole 34 is disposed at the center portion of the conducting plate 33 can also be applied to the conducting plates 4 of the current interruption device 3, 202, and 302.

Fifth Embodiment

Figure 6:
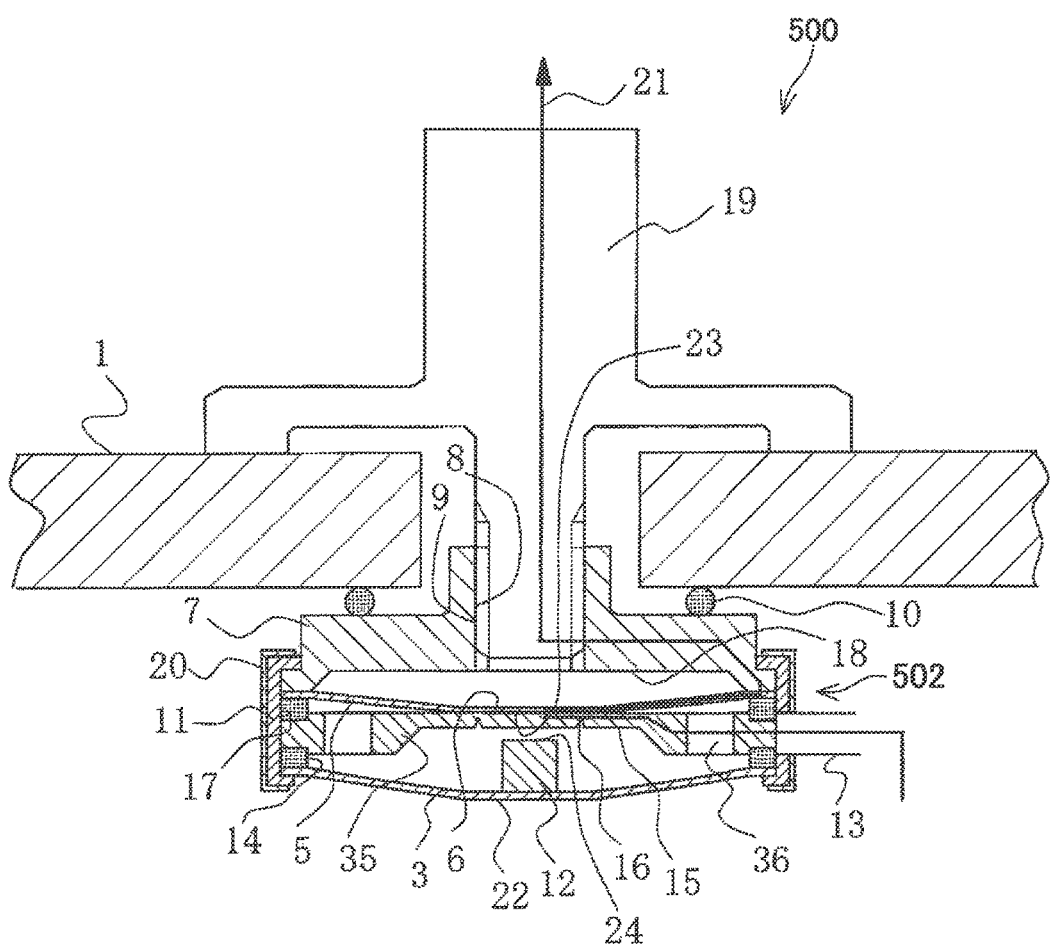
FIG. 6 shows a longitudinal sectional view of a current interruption device of an electric storage device of a fifth embodiment.

An electric storage device 500 is described with reference to FIG. 6. The electric storage device 500 is a modification of the electric storage device 100, and a current interruption device 502 differs in structure from the current interruption device 2 of the electric storage device 100. Members of the electric storage device 500 that are the same as those of the electric storage device 100 are given the same reference signs as those of the electric storage device 100, and as such, may not be described.

In the current interruption device 502, a pressure hole 36 is disposed on a conducting plate 35. The pressure hole 36 is configured to exert a pressure change caused by the deformation of the deforming plate 3 on the contact plate 5. The pressure hole 36 is disposed around the breakable groove 16. Specifically, the pressure hole 36 is disposed between a center portion and an outer circumference portion of the conducting plate 35. Since the pressure hole 36 is disposed on the conducting plate 35, a pressure change caused, if any, when the deforming plate 3 deforms is directly transmitted to the contact plate 5. This makes it possible to more easily break the first contact portion 6 of the conducting plate 35. It should be noted that as in the current interruption devices 202, 302, and 402, the deforming plate 3 and/or the contact plate 5 of the current interruption device 502 may include a wavy portion(s).

Sixth Embodiment

An electric storage device 600 is described with reference to FIGS. 7 and 8. The electric storage device 600 is a modification of the electric storage device 100, and a current interruption device 602 differs in installation location from the current interruption device 2 of the electric storage device 100. Members of the electric storage device 600 that are the same as those of the electric storage device 100 are given the same reference signs as those of the electric storage device 100, and as such, may not be described.

Figure 7:
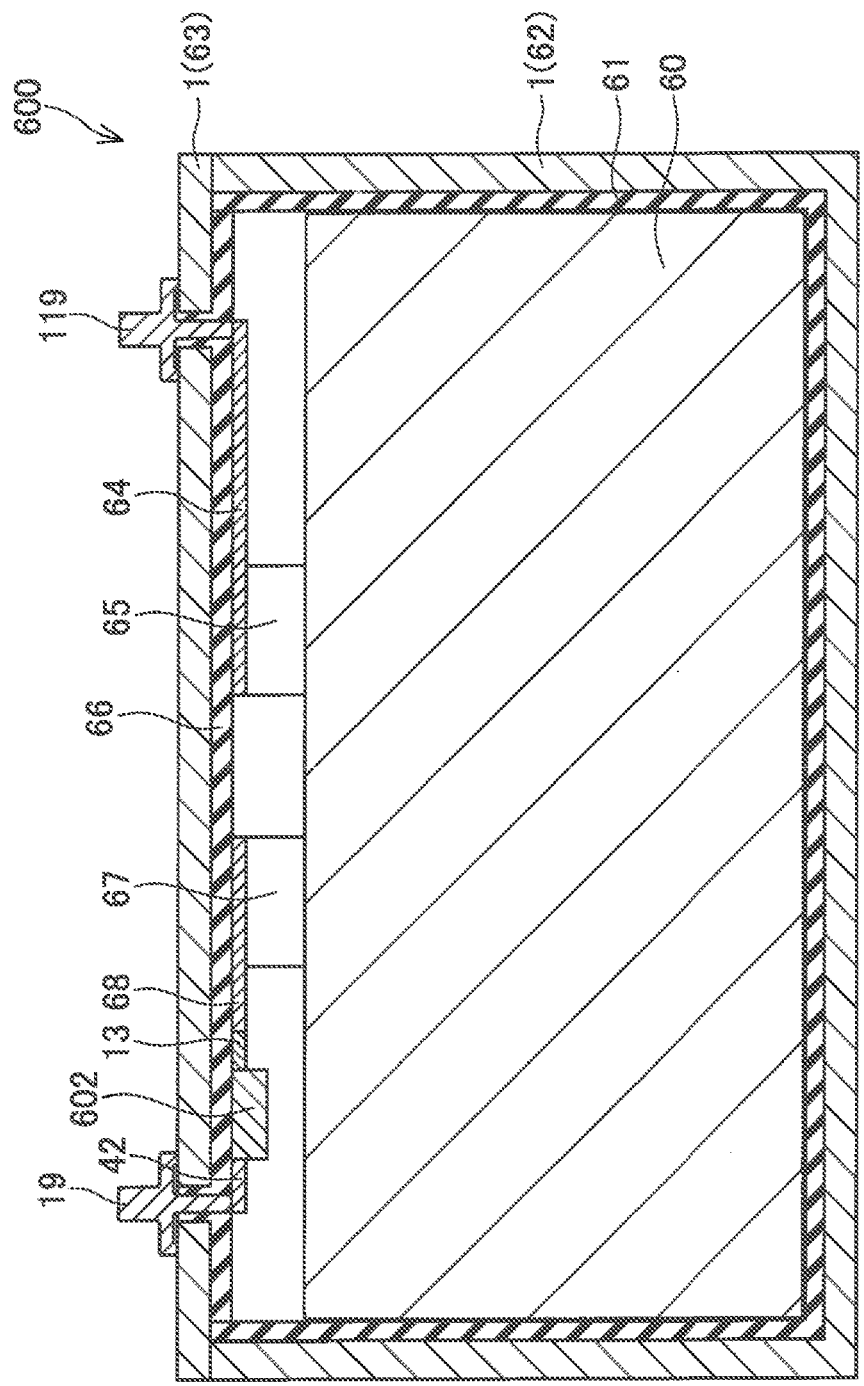
FIG. 7 shows a longitudinal sectional view of an electric storage device of a sixth embodiment.

As shown in FIG. 7, the current interruption device 602 is not screw-fixed to the negative electrode external terminal 19. The current interruption device 602 is electrically connected to the negative electrode external terminal 19 via a connecting member 42 made of metal. That is, unlike the sealing cover body 7 of the current interruption device 2, a sealing cover body 40 (see FIG. 8) is not configured to be disposed below the negative electrode external terminal 19 and screwed to the negative electrode external terminal 19. The negative electrode external terminal 19 is disposed at a short distance away from the current interruption device 602.

Figure 8:
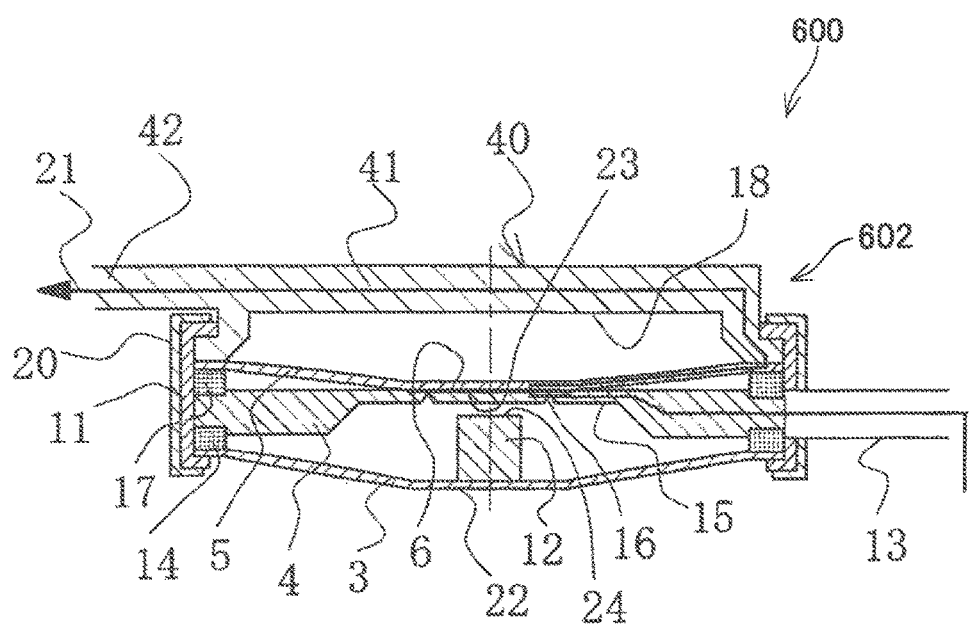
FIG. 8 shows a longitudinal sectional view of a current interruption device of the electric storage device of the sixth embodiment.

As shown in FIG. 8, the sealing cover body 40 includes a main body portion 41 and the connecting member 42 disposed in an outer circumference portion of the main body portion 41. The connecting member 42 is located above the caulking member 20. The connecting member 42 is electrically connected to the negative electrode external terminal 19. In the electric storage device 600, the current interruption device 602 can be disposed inside the electric storage device 600 (inside the casing 1) without taking screw-fixing measures.

Seventh Embodiment

Figure 9:
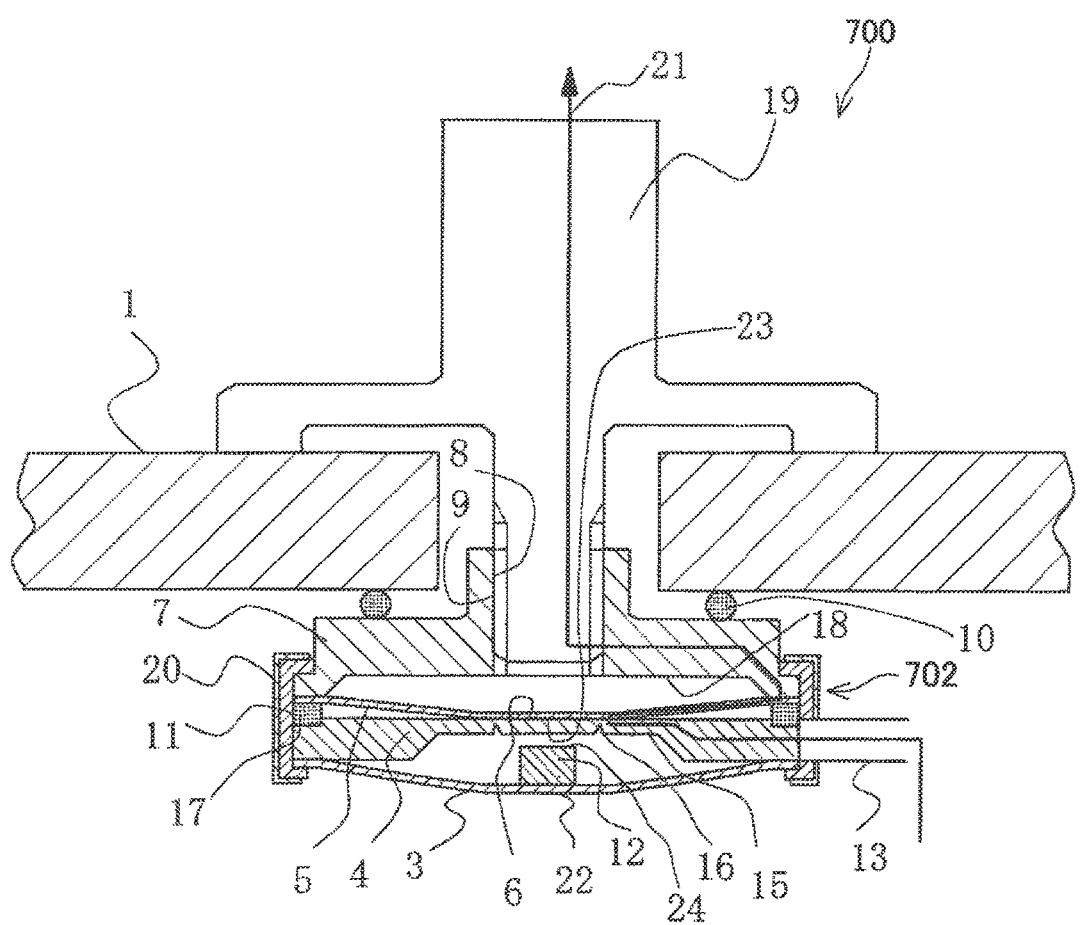
FIG. 9 shows a longitudinal sectional view of a current interruption device of an electric storage device of a seventh embodiment.

An electric storage device 700 is described with reference to FIG. 9. The electric storage device 700 is a modification of the electric storage device 100, and a current interruption device 702 differs in structure from the current interruption device 2 of the electric storage device 100. Members of the electric storage device 700 that are the same as those of the electric storage device 100 are given the same reference signs as those of the electric storage device 100, and as such, may not be described.

In the current interruption device 702, the outer circumference portion of the deforming plate 3 and the outer circumference portion of the conducting plate 4 adhere to each other by welding. By welding the deforming plate 3 and the conducting plate 4 to each other, a space between the deforming plate 3 and the conducting plate 4 can be kept more airtight. That is, unlike the current interruption device 2 (see FIG. 2), the current interruption device 702 does not have a seal member 14 interleaved between the outer circumference portion of the deforming plate 3 and the outer circumference portion of the conducting plate 4. It should be noted that in the current interruption device 702, the deforming plate 3 is made of a weldable metal material so that the deforming plate 3 and the conducting plate 4 can be welded to each other. In the current interruption device 702, the projection 12 is formed to have an insulation property so that the current path can be interrupted. It should be noted that the configuration in which the outer circumference portion of the deforming plate and the outer circumference portion of the conducting plate are welded to each other can also be applied to the current interruption devices 102, 202, 302, 402, 502, and 602.

Eighth Embodiment

Figure 10:
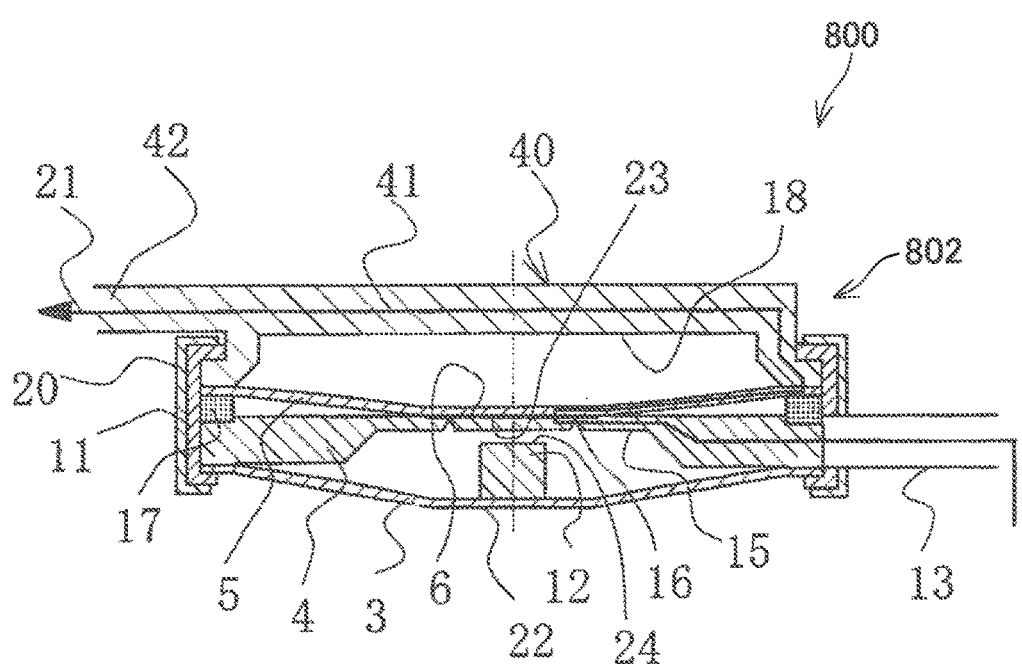
FIG. 10 shows a longitudinal sectional view of a current interruption device of an electric storage device of an eighth embodiment.
Figure 11A:
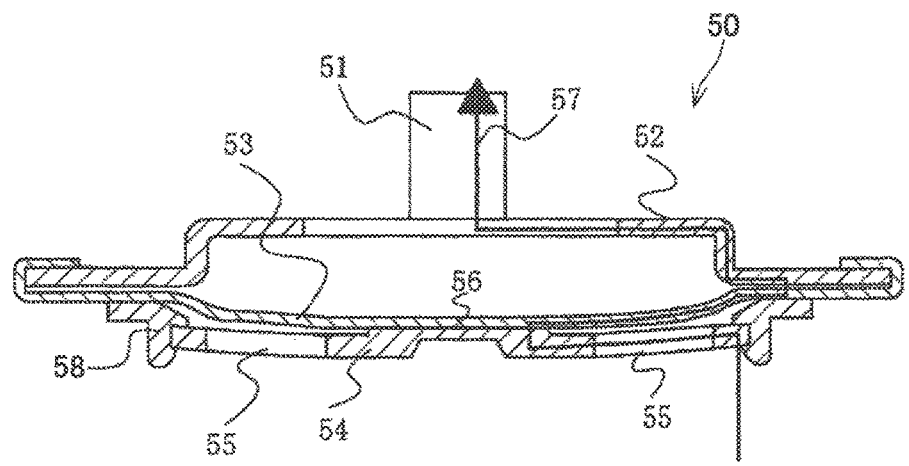
FIG. 11A shows a condition at normal times of a current interruption device of a conventional electric storage device.
Figure 11B:
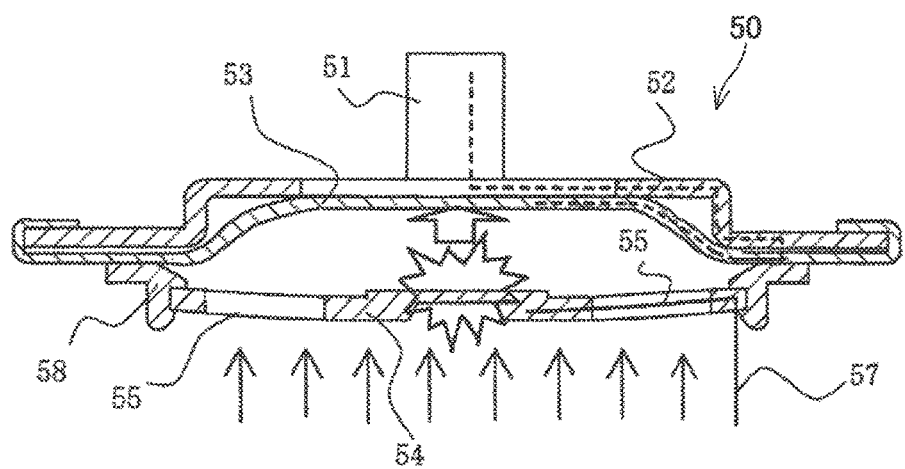
FIG. 11B shows a condition in which a current path is broken in the current interruption device of the conventional electric storage device.

An electric storage device 800 is described with reference to FIG. 10. The electric storage device 800 is a modification of the electric storage device 600, and a current interruption device 802 differs in structure from the current interruption device 602 of the electric storage device 600. Members of the electric storage device 800 that are the same as those of the electric storage device 600 are given the same reference signs as those of the electric storage device 600, and as such, may not be described.

The current interruption device 802 is the equivalent of a current interruption device obtained by applying the features of the current interruption device 702 (see FIG. 9) to the current interruption device 602 (see FIG. 8). That is, the current interruption device 802 is the equivalent of a current interruption device 602 in which the outer circumference portion of the deforming plate 3 and the outer circumference portion of the conducting plate 4 adhere to each other by welding. In the current interruption device 802, the deforming plate 3 is made of a weldable metal material so that the deforming plate 3 and the conducting plate 4 can be welded to each other. In the current interruption device 802, the projection 12 is formed to have an insulation property so that the current path can be interrupted.

Ninth Embodiment

Figure 12A:
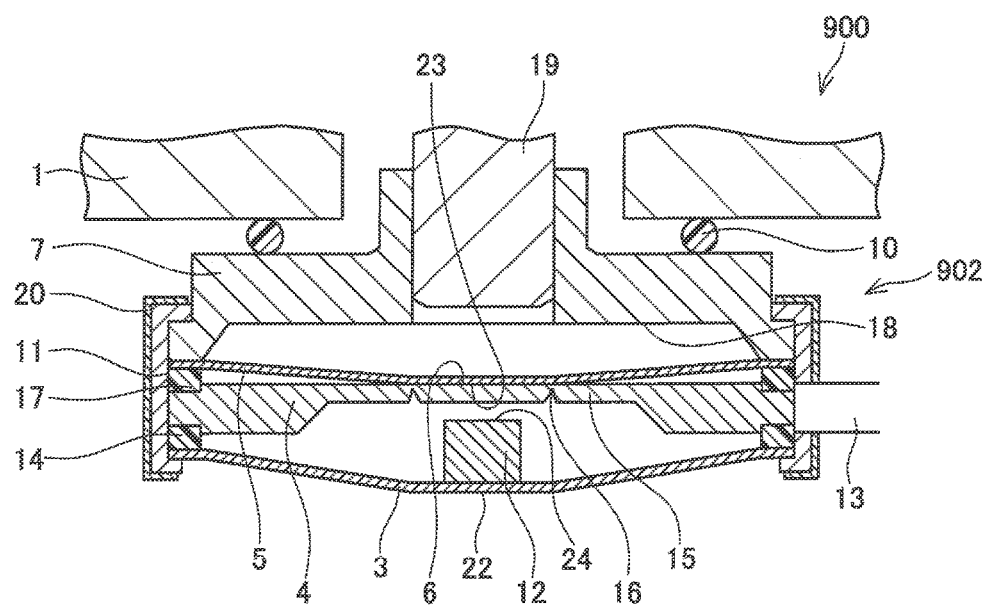
FIG. 12A shows a condition at normal times of a current interruption device of an electric storage device of a ninth embodiment.
Figure 12B:
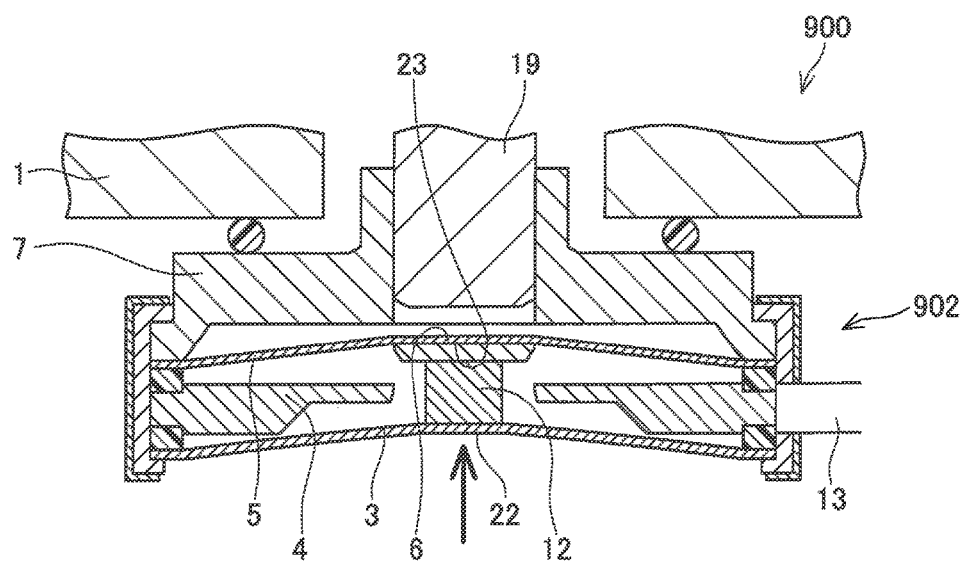
FIG. 12B shows a condition in which a current path has just been broken in the current interruption device of the electric storage device of the ninth embodiment.
Figure 12C:
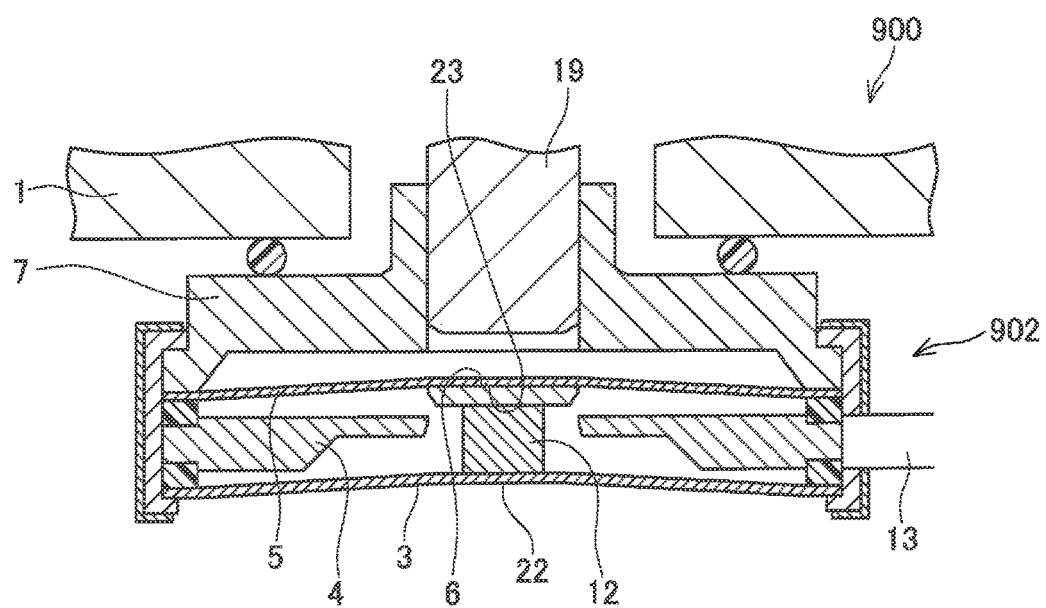
FIG. 12C shows a condition in which a predetermined period of time has elapsed since the current path was broken in the current interruption device of the electric storage device of the ninth embodiment.

An electric storage device 900 is described with reference to FIGS. 12A, 12B, and 12C. The electric storage device 900 is a modification of the electric storage device 100, and a current interruption device 902 differs in structure from the current interruption device 2 of the electric storage device 100. Members of the electric storage device 900 that are the same as those of the electric storage device 100 are given the same reference signs as those of the electric storage device 100, and as such, may not be described. FIG. 12A shows a condition prior to breakage of a current path. FIG. 12B shows a condition in which the current path has just been broken. FIG. 12C shows a condition in which a predetermined period of time has elapsed since the current path was broken.

Components constituting the current interruption device 902 are the same in form as those constituting the current interruption device 2. In the current interruption device 902, materials for and dimensions of the deforming plate 3 and the contact plate 5 are adjusted so that the current interruption device 902 operates first as shown in FIG. 12A, next as shown in FIG. 12B, and then as shown in FIG. 12C. As shown in FIG. 12A, when the internal pressure of the casing 1 is below the predetermined level, a serial current path is formed which extends from the electrode assembly 60 (see FIG. 1) to the negative electrode external terminal 19. At this point in time, there is a gap between an end face of the deforming plate 3 that faces the conducting plate 4 (a surface of the projection 12 that faces the conducing plate 4) and the conducing plate 4 (first condition).

As shown in FIG. 12B, when gas is generated within the casing 1 and the internal pressure of the casing 1 rises above the predetermined level, the deforming plate 3 deforms (gets inverted) upward. This causes the projection 12 to hit the conducting plate 4. An inverting force with which the deforming plate 3 gets inverted upward is greater than a force with which the breakable groove 16 of the conducting plate 4 gets broken. Therefore, when the deforming plate 3 deforms upward, the conducting plate 4 gets broken starting from the breakable groove 16. The projection 12 adds an impact to the conducting plate 4 and the contact plate 5. This causes the contact plate 5 to be separated from the conducting plate 4, together with a broken portion of the conducting plate 4 (second condition). As a result, the current path that extends from the electrode assembly 60 (see FIG. 1) to the negative electrode external terminal 19 gets interrupted.

As shown in FIG. 12C, when a predetermined period of time has elapsed since the conducting plate 4 broke, the distance between the contact plate 5 and the conducting plate 4 becomes shorter than it was in the second condition (third condition). This is because the impact added from the projection 12 to the contact plate 5 disappears and a restoring force is generated in the contact plate 5. The contact plate 5 stops at a position where a force of the contact plate 5 moving toward the conducting plate 4 and a force of the deforming plate 3 getting inverted (a force of the deforming plate 3 separating the contact plate 5 from the conducting plate 4) are balanced. The current interruption device 902 is adjusted so that a gap between the contact plate 5 and the conducting plate 4 is 1 mm or wider. When the gap between the contact plate 5 and the conducting plate 4 is 1 mm or wider, the contact plate 5 and the conducting plate 4 do not conduct witch each other. That is, a condition in which the current path is interrupted can be maintained, and the electrode assembly 60 and the negative electrode external terminal 19 can be surely prevented from conducting again with each other.

The features of the current interruption device 902 can be applied to all of the embodiments described above. That is, all of the embodiments described above may be adjusted so that after a predetermined period of time has elapsed since the current path got broken, a force of the contact plate 5 moving toward the conducting plate 4 and a force of the deforming plate 3 getting inverted are balanced at a position where the contact plate 5 and the conducting plate 4 do not conduct with each other.

Tenth Embodiment

Figure 13A:
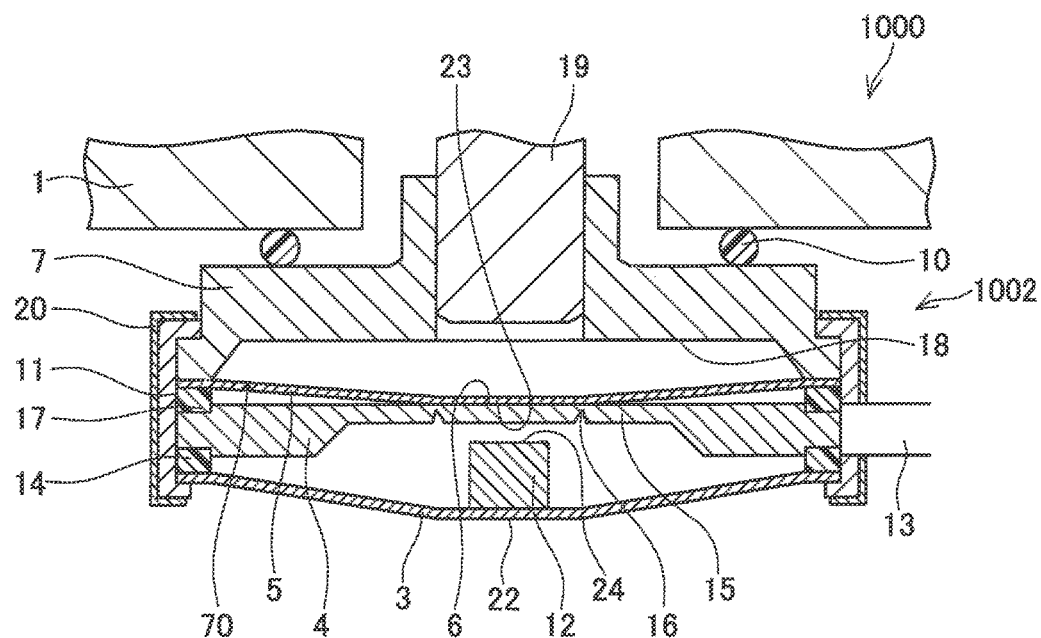
FIG. 13A shows a condition at normal times of a current interruption device of an electric storage device of a tenth embodiment.
Figure 13B:
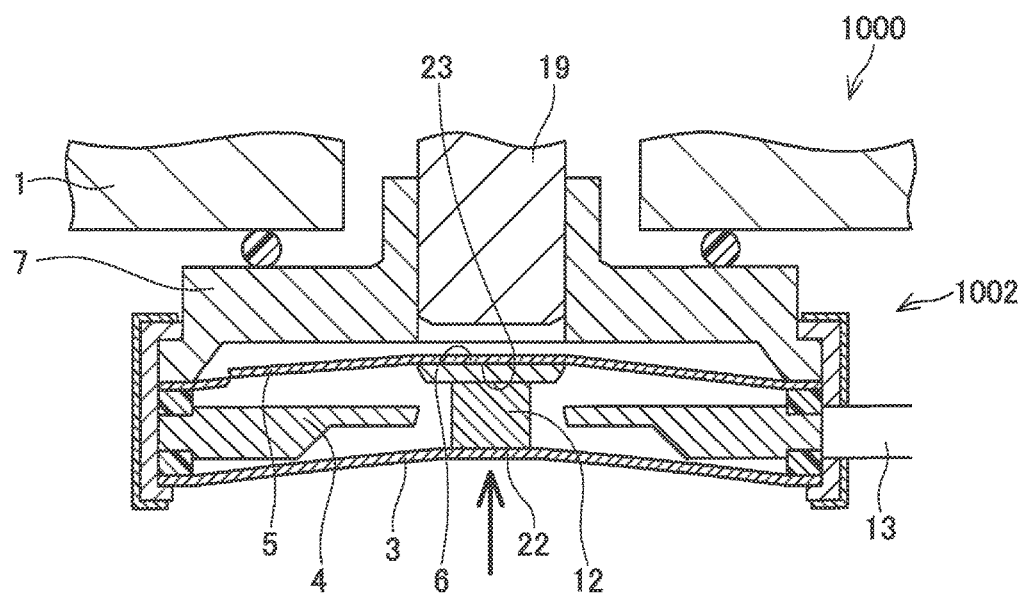
FIG. 13B shows a condition in which a current path is broken in the current interruption device of the electric storage device of the tenth embodiment.

An electric storage device 1000 is described with reference to FIGS. 13A and 13B. The electric storage device 1000 is a modification of the electric storage device 100, and a current interruption device 1002 differs in structure from the current interruption device 2 of the electric storage device 100. Members of the electric storage device 1000 that are the same as those of the electric storage device 100 are given the same reference signs as those of the electric storage device 100, and as such, may not be described. FIG. 13A shows a condition prior to breakage of a current path, and FIG. 13B shows a condition subsequent to breakage of the current path.

In the current interruption device 1002, a fragile portion is provided as a portion of the contact plate 5. Specifically, a breakable groove 70 is disposed midway between the center portion and the outer circumference portion of the contact plate 5. In the current interruption device 1002, as shown in FIG. 13B, when the conducting plate 4 breaks, the contact plate 5 breaks starting from the breakable groove 70. This prevents a restoring force (force of moving toward the conducting plate 4) from being generated in the contact plate 5. The electrode assembly 60 and the negative electrode external terminal 19 can be surely prevented from conducting again with each other after interruption of the current path.

Figure 14:
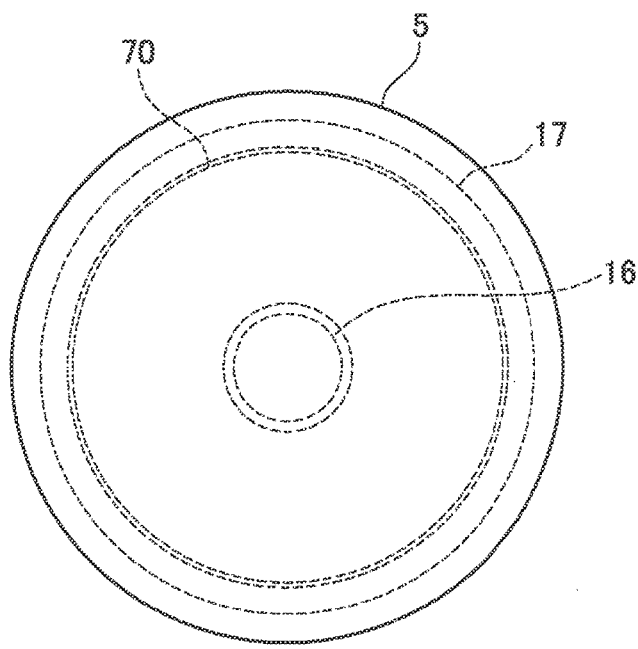
FIG. 14 shows a plan view of a contact plate of the current interruption device of the tenth embodiment.

The position where the fragile portion (breakable groove 70) is disposed is described with reference to FIG. 14. The fragile portion is disposed between the center portion (breakable groove 16) and the outer circumference portion (portion that makes contact with the seal member 17) of the contact plate 5. The fragile portion (breakable groove 70) may circumferentially surround an entire periphery of the contact plate 5 as shown in FIG. 14, or may be dispersedly disposed in a portion indicated by a broken line 70 in FIG. 14. The fragile portion may come in any of various forms that can suppress a restoring force which is generated in the contact plate 5.

It should be noted that although the current interruption device 1002 has been described by taking, as an example of a fragile portion, a case where the breakable groove 70 is disposed, the contact plate 5 does not necessarily need to break starting from the breakable groove 70. The contact plate 5 may be plastically deformed starting from the breakable groove 70 when the conducting plate 4 breaks. In this case, too, a restoring force can be prevented from being generated in the contact plate. It should be noted that instead of the breakable groove 70 being disposed in the contact plate 5, such a fragile portion may be provided as a portion of the contact plate 5 that the contact plate 5 is plastically deformed. For example, a portion of the contact plate 5 may be processed by a press or the like to be hardened. Alternatively, a portion of the contact plate 5 may be heat-treated (quenched).

Eleventh Embodiment

Figure 15:
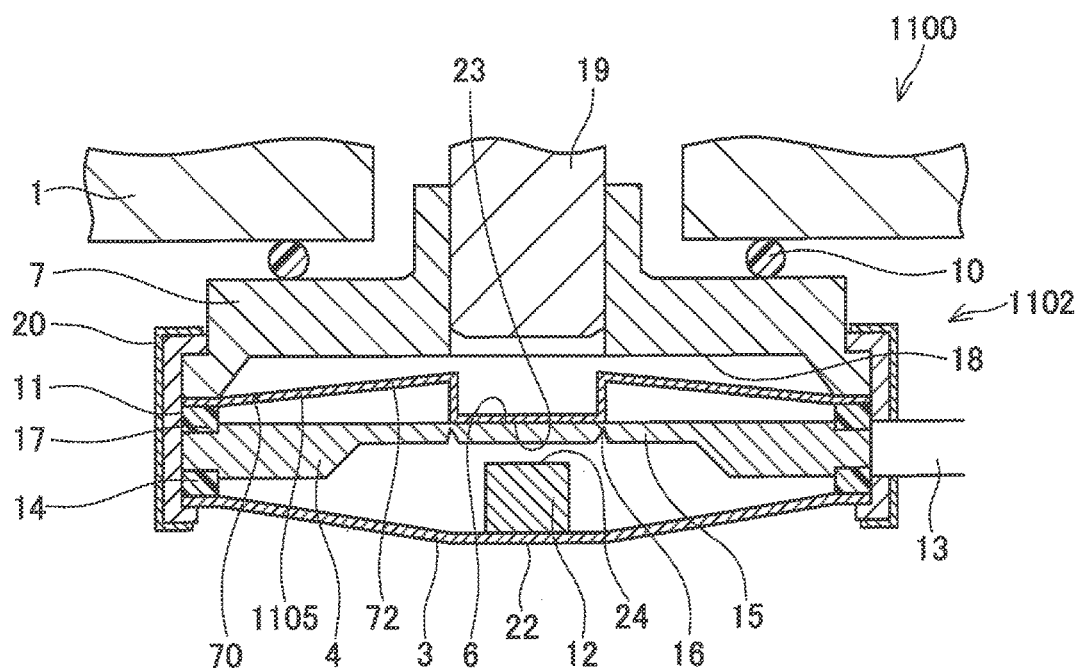
FIG. 15 shows a longitudinal sectional view of a current interruption device of an electric storage device of an eleventh embodiment.

An electric storage device 1100 is described with reference to FIG. 15. The electric storage device 1100 is a modification of the electric storage device 1000, and a current interruption device 1102 differs in structure from the current interruption device 1002 of the electric, storage device 1000. Members of the electric storage device 1100 that are the same as those of the electric storage device 1000 are given the same reference signs as those of the electric storage device 1000, and as such, may not be described.

In the current interruption device 1102, a contact plate 1105 is provided with an interspacing portion 72. The interspacing portion 72 is disposed between an outer circumference portion and a center portion (second contact portion 23) of the contact plate 1105. In the interspacing portion 72, a distance from the contact plate 1105 to the conducting plate 4 is increased from an outer circumference portion of a contact plate 1205 toward a center portion of the contact plate 1205. Specifically, the contact plate 1105 extend in a direction away from the contacting plate 4 from the outer circumference portion to the center portion, and the center portion is curved toward the conducting plate 4. It should be noted that the fragile portion (breakable groove 70) is disposed on the interspacing portion 72.

In the current interruption device 1102, the distance from the contact plate 1105 to the conducting plate 4 after interruption of the current path can be increased. The contact plate 1105 and the conducting plate 4 can be more surely prevented from conducting again with each other after interruption of the current path.

Twelfth Embodiment

Figure 16A:
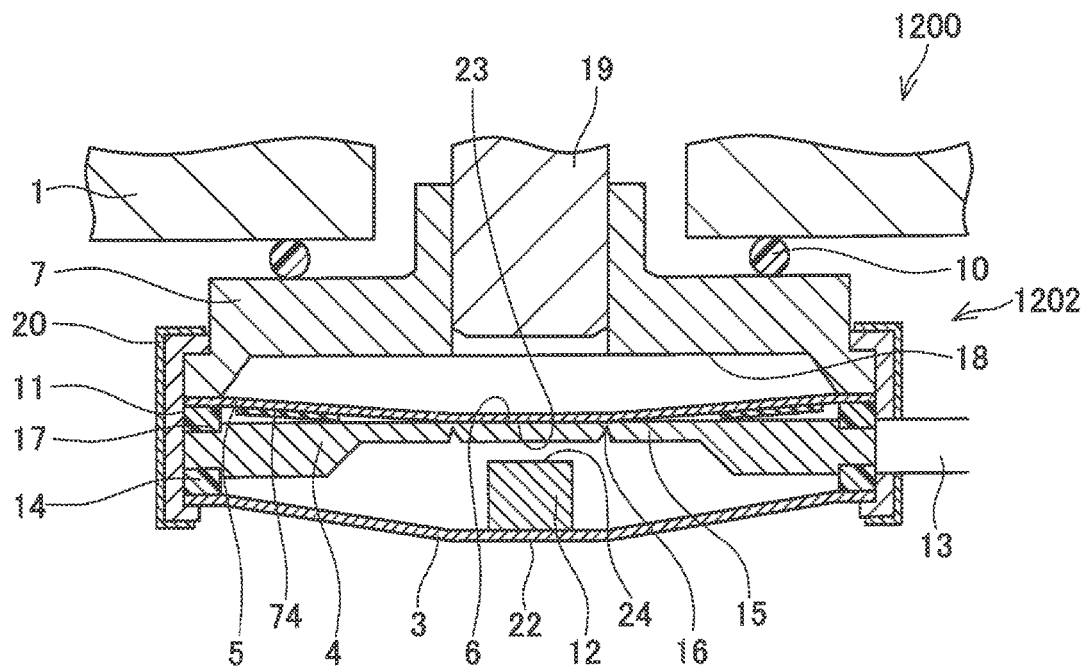
FIG. 16A shows a condition at normal times of a current interruption device of an electric storage device of a twelfth embodiment.

An electric, storage device 1200 is described with reference to FIGS. 16A, 16B, and 16C. The electric storage device 1200 is a modification of the electric storage device 100, and a current interruption device 1202 differs in structure from the current interruption device 2 of the electric storage device 100. Members of the electric storage device 1200 that are the same as those of the electric storage device 100 are given the same reference signs as those of the electric storage device 100, and as such, may not be described. FIG. 16A shows a condition prior to breakage of a current path, and FIGS. 16B and 16C each show a condition subsequent to breakage of the current path.

In the current interruption device 1202, an insulating member having an insulation property is disposed between the contact plate 5 and the conducting plate 4. Specifically, an insulating sheet 74 is pasted to a surface of the contact plate 5 between the outer circumference portion of the contact plate 5 and the second contact portion 23. As shown in FIG. 16A, the insulating sheet 74 is not provided in the second contact portion 23. Further, since the insulating sheet 74 is attached to a surface of the contact plate 5, a conducting path of the contact plate 5 will not be narrowed. Therefore, the negative electrode external terminal 19 and the electrode assembly 60 (see FIG. 1) will not be hindered from conducting with each other.

Figure 16B:
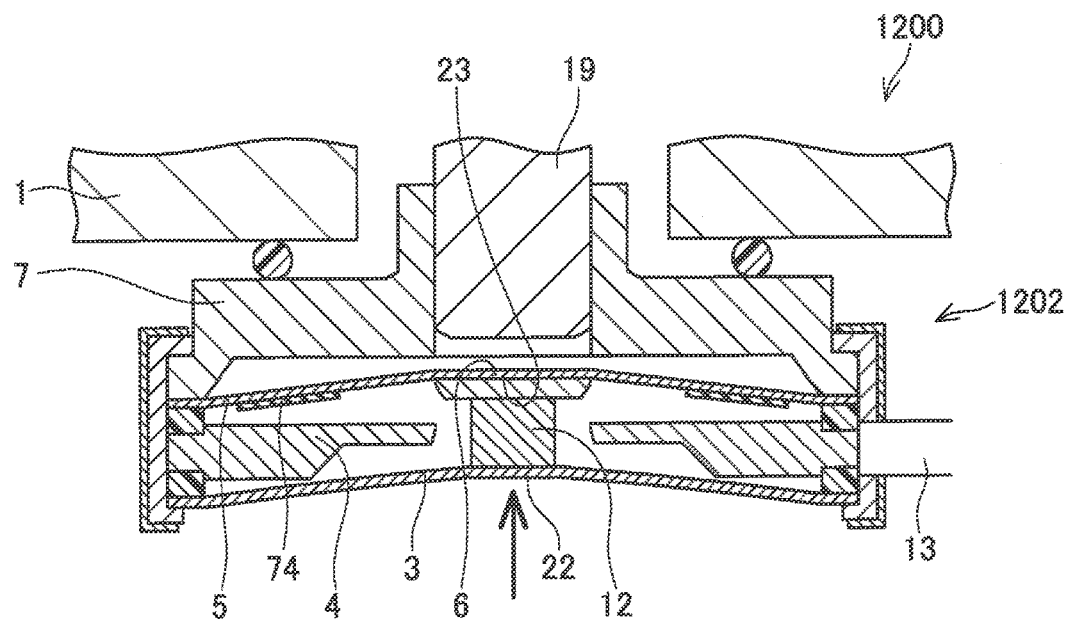
FIG. 16B shows a condition in which a current path is broken in the current interruption device of the electric storage device of the twelfth embodiment.
Figure 16C:
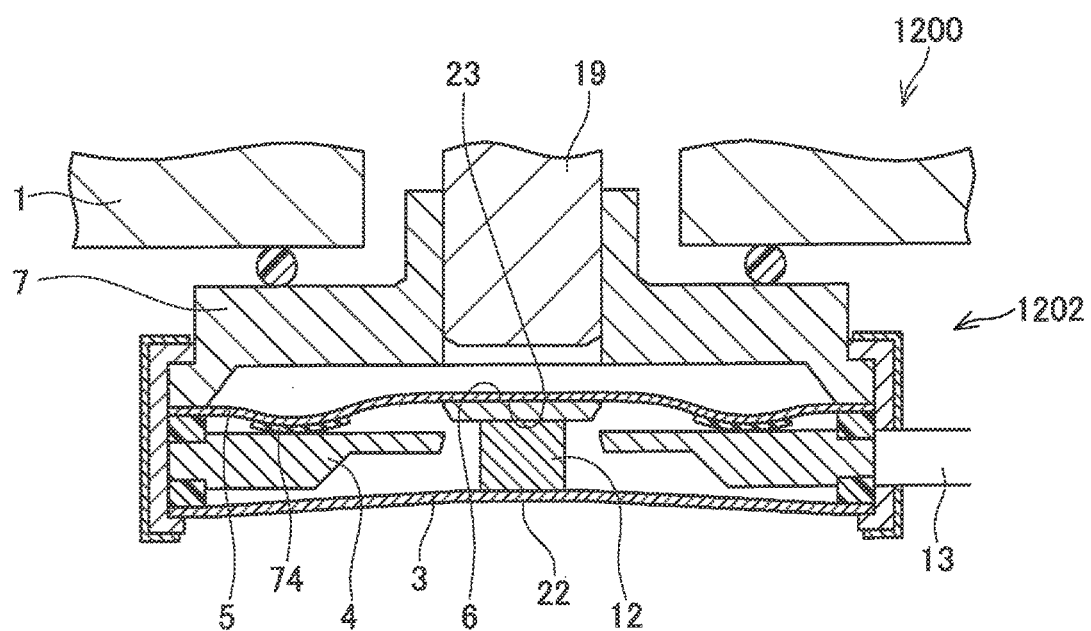
FIG. 16C shows a condition in which the current path is broken in the current interruption device of the electric storage device of the twelfth embodiment.

As shown in FIG. 16B, when the conducting plate 4 breaks and the current path gets interrupted, the insulating sheet 74 moves upward, together with the contact plate 5. In the current interruption device 1202, as shown in FIG. 16C, for example, even in a case where only the center portion of the contact plate 5 moves upward when the conducting plate 4 breaks, the contact plate 5 and the conducting plate 4 can be prevented from conducting with each other. The contact plate 5 and the conducting plate 4 can be more surely prevented from conducting with each other after interruption of the current path.

It should be noted that it is possible to cover the surface of the contact plate 5 with an insulating coating instead of pasting the insulating sheet 74 to the surface of the contact plate 5. In this case, it is preferable that the outer circumference potion of the contact plate 5 and the second contact portion 23 be covered with the insulating coating. That is, in order for the first contact portion 6 and the second contact portion 23 not to be hindered from conducting with each other, it is preferable that the second contact portion 23 not be covered with the insulating coating.

Thirteenth Embodiment

Figure 17A:
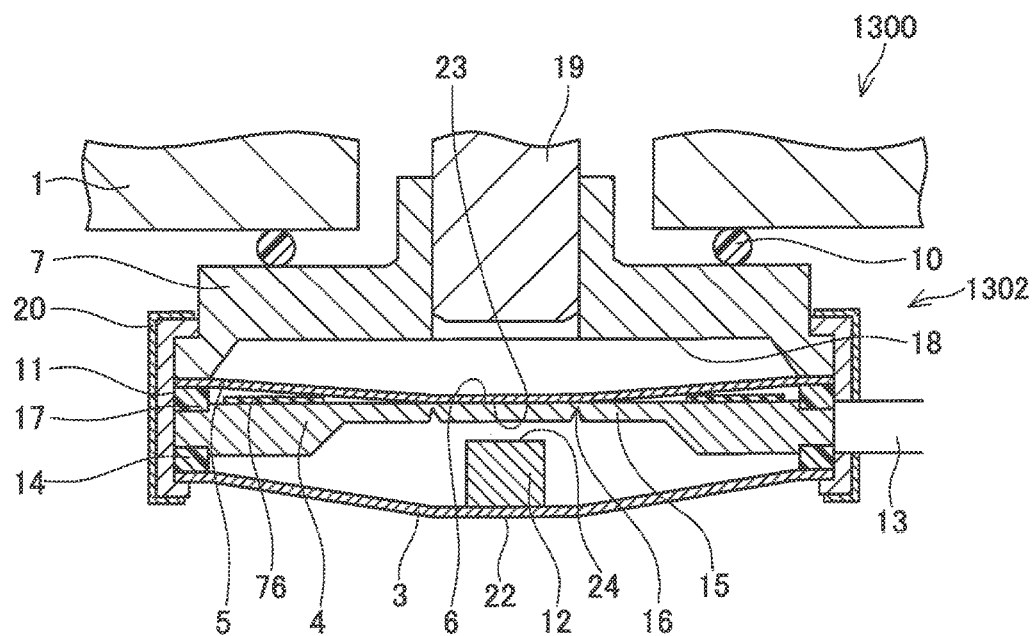
FIG. 17A shows a condition at normal times of a current interruption device of an electric storage device of a thirteenth embodiment.

An electric storage device 1300 is described with reference to FIGS. 17A, 17B, and 17C. The electric storage device 1300 is a modification of the electric storage device 1200, and a current interruption device 1302 differs in structure from the current interruption device 1202 of the electric storage device 1200. Members of the electric storage device 1300 that are the same as those of the electric storage device 1200 are given the same reference signs as those of the electric storage device 1200, and as such, may not be described. FIG. 17A shows a condition prior to breakage of a current path, and FIGS. 17B and 17C each show a condition subsequent to breakage of the current path.

In the current interruption device 1302, an insulating sheet 76 is pasted to a surface of the conducting plate 4 between the outer circumference portion of the conducting plate 4 and the breakable groove 16. As shown in FIG. 17A, the insulating sheet 76 is disposed closer to an outer circumference of the conducting plate 4 than the breakable groove 16. That is, the insulating sheet 76 is not disposed in the first contact portion 6. Further, sine the insulating sheet 76 is pasted to the surface of the conducting plate 4, a conducting path of the conducting plate 4 will not be narrowed. The negative electrode external terminal 19 and the electrode assembly 60 (see FIG. 1) will not be hindered from conducting with each other.

Figure 17B:
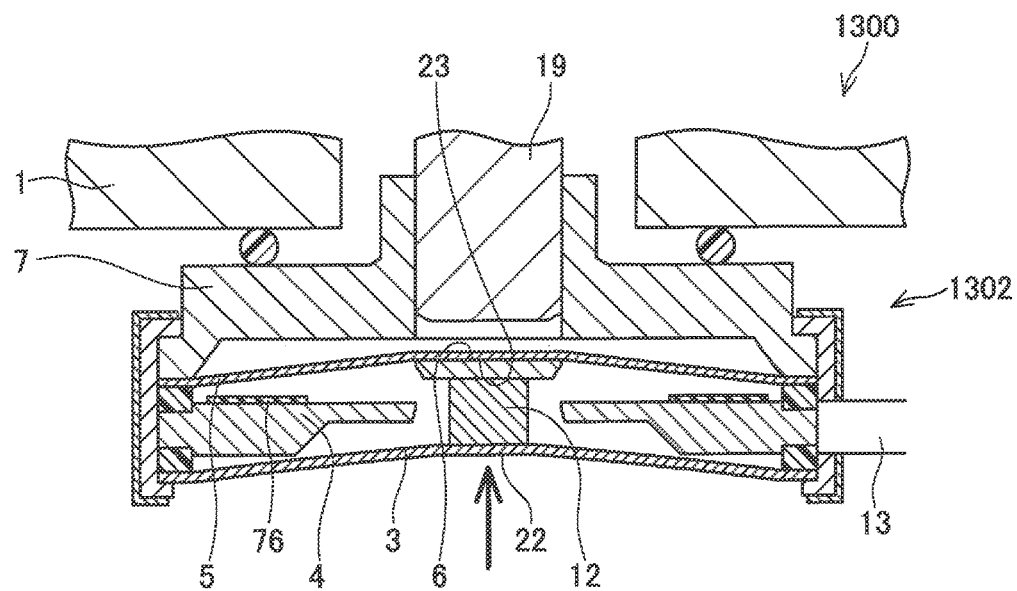
FIG. 17B shows a condition in which a current path is broken in the current interruption device of the electric storage device of the thirteenth embodiment.
Figure 17C:
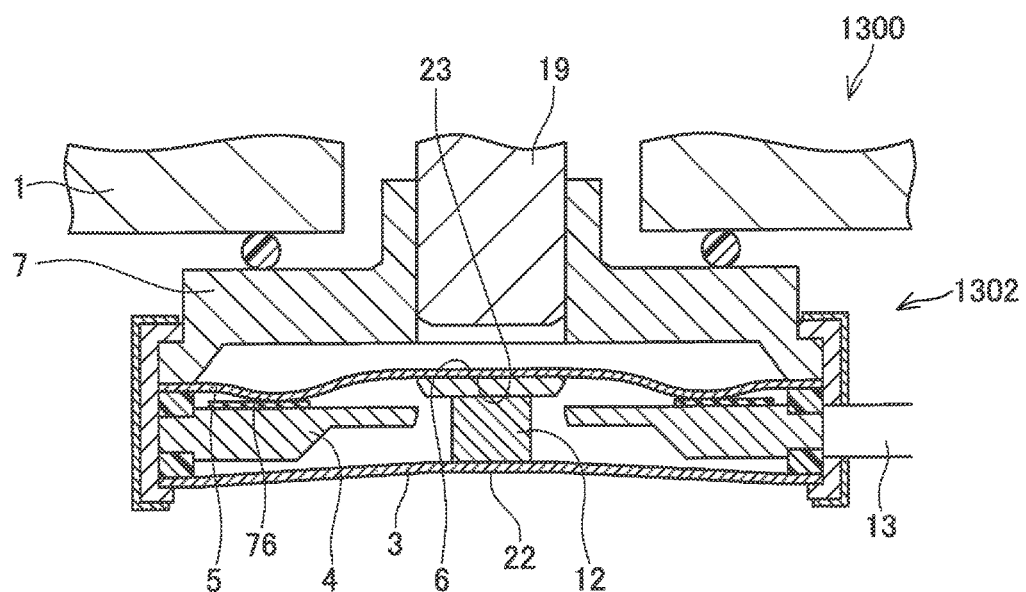
FIG. 17C shows a condition in which the current path is broken in the current interruption device of the electric storage device of the thirteenth embodiment.

As shown in FIG. 17B, when the conducting plate 4 breaks and the current path gets interrupted, only the contact plate 5 moves upward, without a change in the position of the insulating sheet 76. Therefore, the insulating sheet 76 will not affect the deformation of the contact plate 5. It should be noted that as shown in FIG. 17C, even in a case where only the center portion of the contact plate 5 moves upward when the conducting plate 4 breaks, the contact plate 5 and the conducting plate 4 can be prevented from conducting with each other. The contact plate 5 and the conducting plate 4 can be more surely prevented from conducting with each other after interruption of the current path. It should be noted that as in the current interruption device 1202, it is possible to cover the surface of the conducting plate 4 with an insulating coating instead of pasting the insulating sheet 76 to the surface of the conducting plate 4.

Fourteenth Embodiment

Figure 18A:
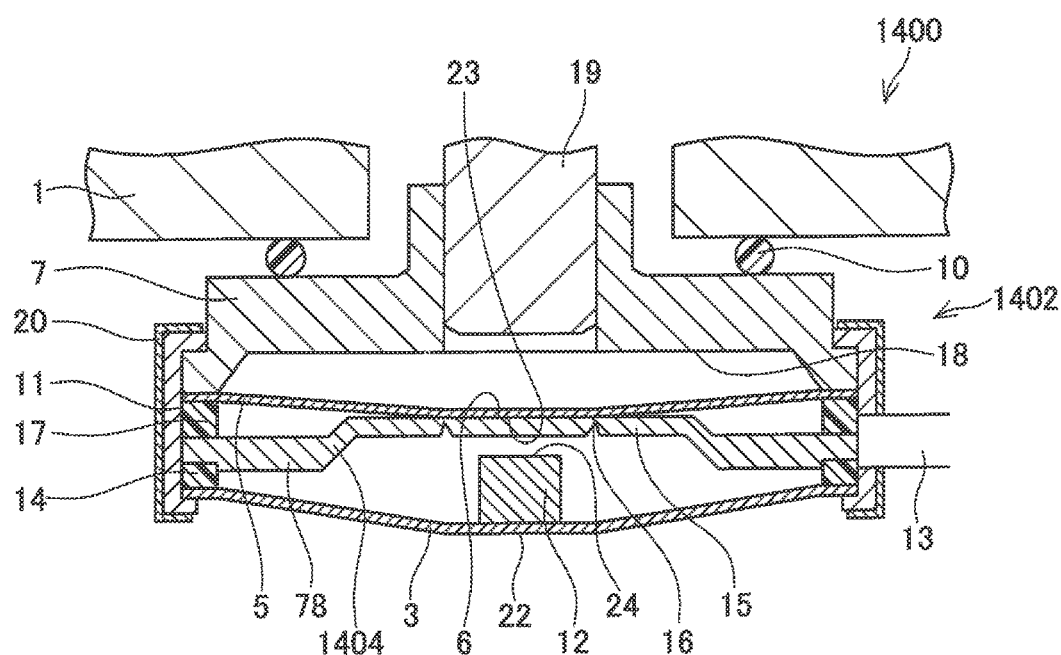
FIG. 18A shows a condition at normal times of a current interruption device of an electric storage device of a fourteenth embodiment.
Figure 18B:
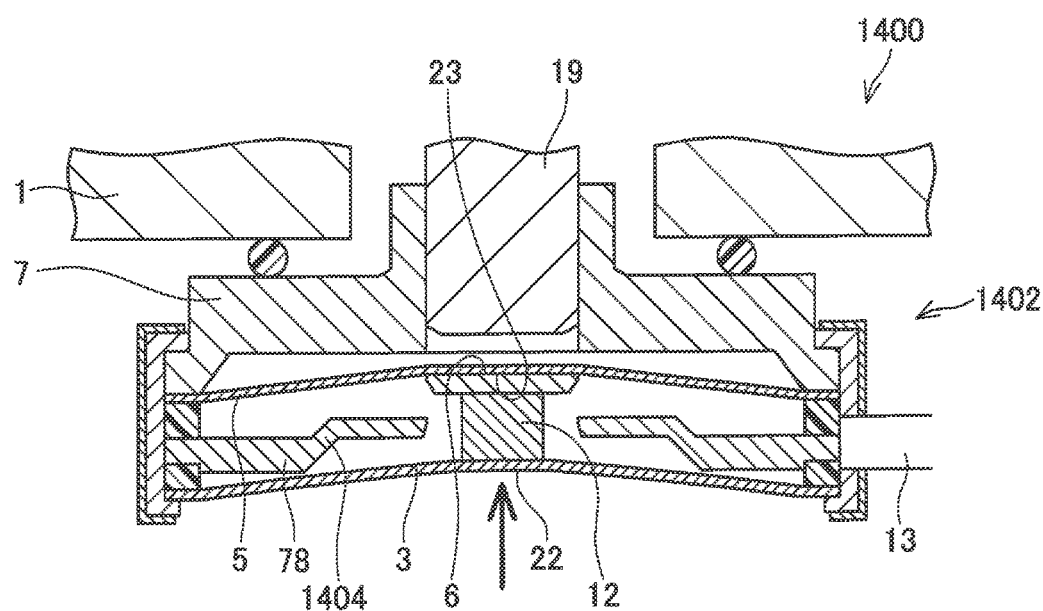
FIG. 18B shows a condition in which a current path is broken in the current interruption device of the electric storage device of the fourteenth embodiment.

An electric storage device 1400 is described with reference to FIGS. 18A and 18B. The electric storage device 1400 is a modification of the electric, storage device 100, and a current interruption device 1402 differs in structure from the current interruption device 2 of the electric storage device 100. Members of the electric storage device 1400 that are the same as those of the electric storage device 100 are given the same reference signs as those of the electric storage device 100, and as such, may not be described. FIG. 18A shows a condition prior to breakage of a current path, and FIG. 18B shows a condition subsequent to breakage of the current path.

In the current interruption device 1402, as shown in FIG. 18A, a recess 78 is formed on an outer circumference of the first contact portion 6 of a conducting plate 1404. In other words, a recess 78 surrounding the first contact portion 6 is disposed in a surface of the conducting plate 1404 that faces the contact plate 5. As shown in FIG. 18B, after the conducting plate 1404 breaks and the current path gets interrupted, a distance between the conducting plate 1404 and the contact plate 5 can be made larger. The electrode assembly 60 and the negative electrode external terminal 19 can be more surely prevented from conducting again with each other after interruption of the current path.

Fifteenth Embodiment

An electric storage device 1500 is described with reference to FIG. 19. The electric storage device 1500 is a modification of the electric storage device 100, and a current interruption device 1502 differs in structure from the current interruption device 2 of the electric storage device 100. Members of the electric storage device 1500 that are the same as those of the electric storage device 100 are given the same reference signs as those of the electric storage device 100, and as such, may not be described.

Figure 19:
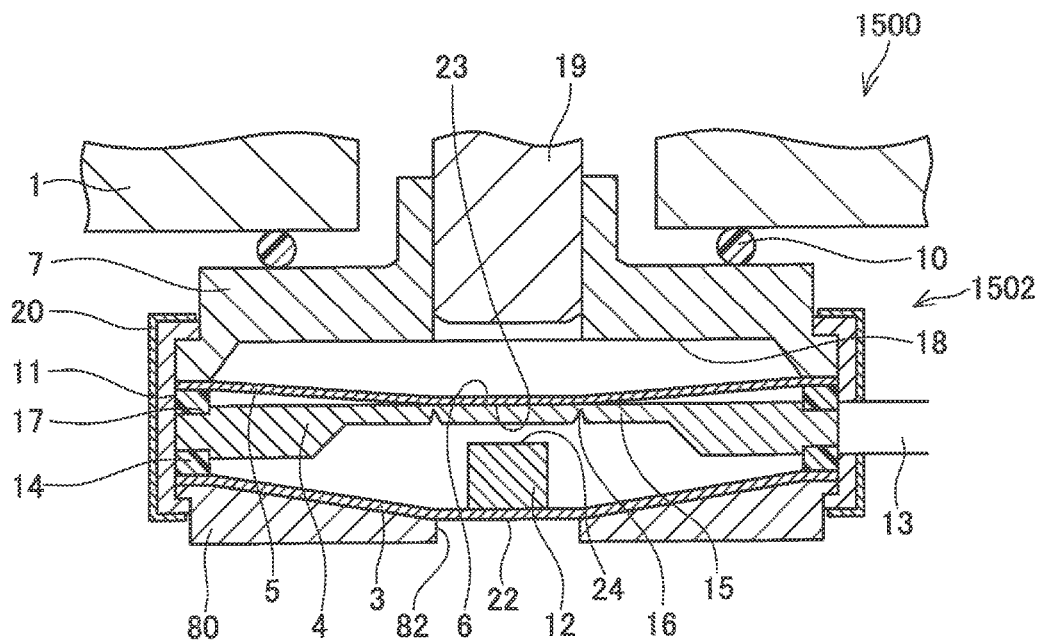
FIG. 19 shows a longitudinal sectional view of a current interruption device of an electric storage device of a fifteenth embodiment.

In the current interruption device 1502, as shown in FIG. 19, an insulating guard plate 80 is disposed below the deforming plate 3. The guard plate 80 is supported by the supporting member 11, together with the deforming plate 3, the seal member 14, the conducting plate 4, the seal member 17, the contact plate 5, and the sealing cover body 7. The guard plate 80 is disposed between the deforming plate 3 and the electrode assembly 60 (see FIG. 1). This makes it possible to prevent the deforming plate 3 from malfunctioning even if the electrode assembly 60 makes contact with the current interruption device 1502. The current path between the electrode assembly 60 and the negative electrode external terminal 19 can be prevented from getting interrupted when the internal pressure of the casing 1 is below the predetermined level (the internal pressure of the casing 1 is normal). Further, since the guard plate 80 is insulative, it can prevent the deforming plate 3 and the electrode assembly 60 from making contact to form a short circuit. It should be noted that the guard plate 80 is provided with a through-hole 82. Therefore, when the internal pressure of the casing 1 rises above the predetermined pressure, pressure is not hindered from being applied to the pressure receiving portion 22 of the deforming plate 3.

Sixteenth Embodiment

An electric storage device 1600 is described with reference to FIG. 20. The electric storage device 1600 is a modification of the electric storage device 100, and a current interruption device 1602 differs in structure from the current interruption device 2 of the electric storage device 100. Members of the electric storage device 1600 that are the same as those of the electric storage device 100 are given the same reference signs as those of the electric storage device 100, and as such, may not be described.

Figure 20:
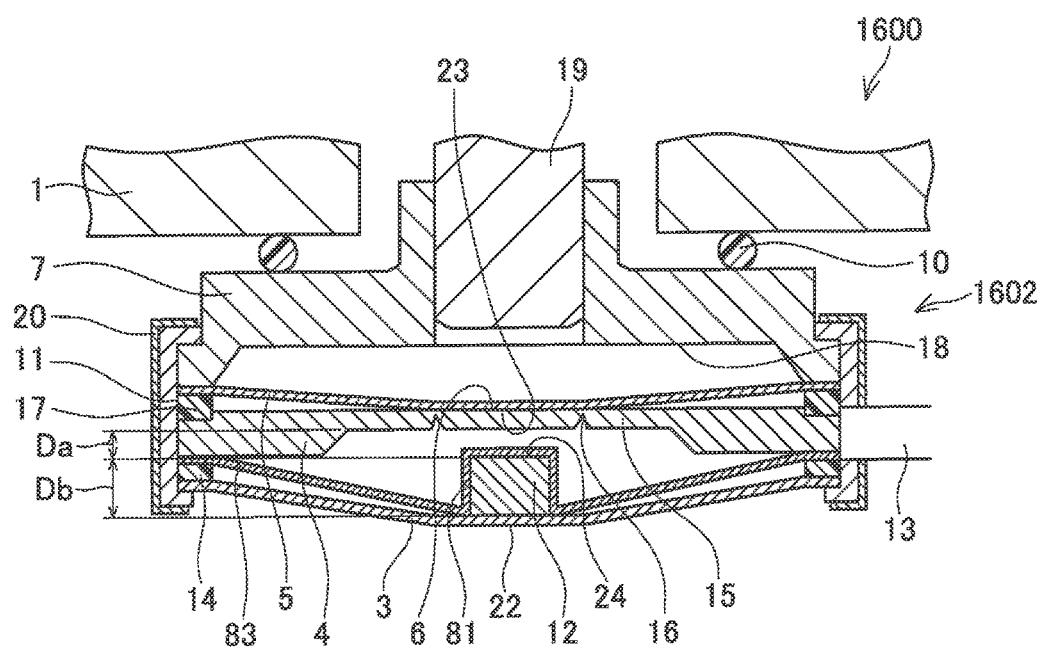
FIG. 20 shows a longitudinal sectional view of a current interruption device of an electric storage device of a sixteenth embodiment.

As shown in FIG. 20, the current interruption device 1602 includes a cap 81 covering the projection 12. The cap 81 is made of an insulating material. The cap 81 includes a guide 83, and the guide 83 is supported by the supporting member 11. That is, the cap 81 is supported by the supporting member 11, together with the deforming plate 3, the seal member 14, the conducting plate 4, the seal member 17, the contact plate 5, and the sealing cover body 7. Since the current interruption device 1602 includes the insulating cap 81, the projection 12 can be made of a conductive material such as metal.

At a position in the current interruption device 1602 where the conducting plate 4 and the projection 12 face each other, a distance Da between the surface of the conducting plate 4 and the surface of the projection 12 is shorter than a distance Db that the cap 81 covers a side face of the projection 12. This makes it possible to prevent the cap 81 from coming off the projection 12. Further, since the guide 83 is supported by the supporting member 11, it can make it hard for the cap 81 to shift in position with respect to the projection 12. Further, even when the projection 12 is not fixed to the deforming plate 3, the guide 83 makes it possible to position the projection 12 with respect to the deforming plate 3.

Seventeenth Embodiment

An electric storage device 1700 is described with reference to FIG. 21. The electric storage device 1700 is a modification of the electric storage device 1600, and a current interruption device 1702 differs in structure from the current interruption device 1602 of the electric storage device 1600. Members of the electric storage device 1700 that are the same as those of the electric storage device 1600 are given the same reference signs as those of the electric storage device 1600, and as such, may not be described.

Figure 21:
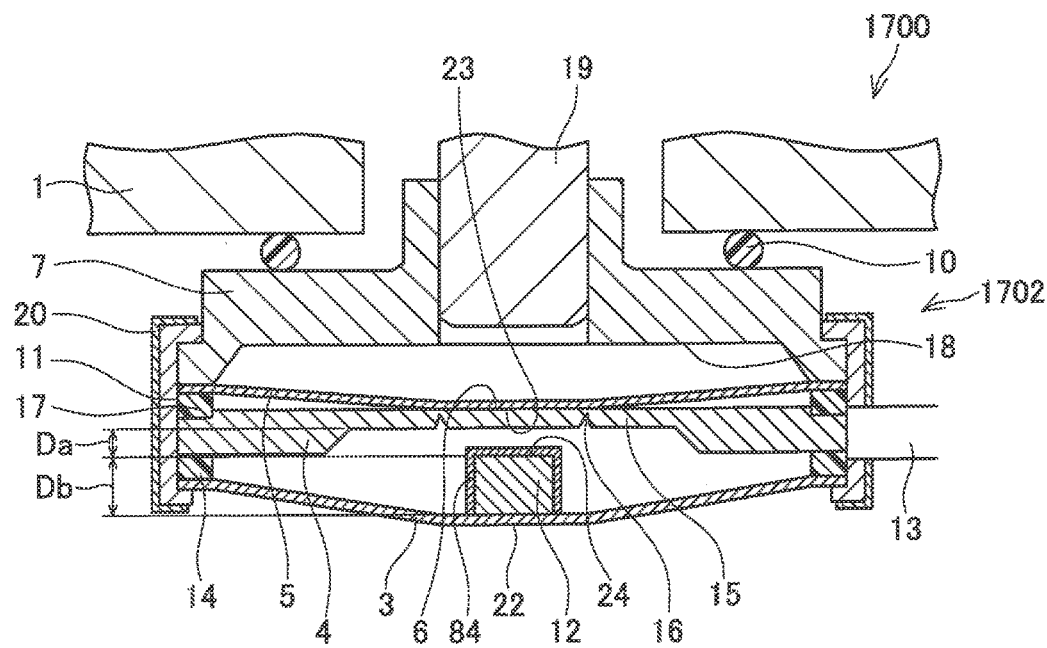
FIG. 21 shows a longitudinal sectional view of a current interruption device of an electric storage device of a seventeenth embodiment.

In the current interruption device 1702, as shown in FIG. 21, a cap 84 does not include a guide. However, at the position where the conducting plate 4 and the projection 12 face each other, the distance Da between the surface of the conducting plate 4 and the surface of the projection 12 is shorter than a distance Db that the cap 84 covers a side face of the projection 12. This makes it possible to prevent the cap 84 from coming off the projection 12. The cap of the current interruption device 1702 can be simpler in shape than that of the current interruption device 1602.

Eighteenth Embodiment

An electric storage device 1800 is described with reference to FIG. 22. The electric storage device 1800 is a modification of the electric storage device 1700, and a current interruption device 1802 differs in structure from the current interruption device 1702 of the electric storage device 1700. Members of the electric storage device 1800 that are the same as those of the electric storage device 1700 are given the same reference signs as those of the electric storage device 1700, and as such, may not be described.

Figure 22:
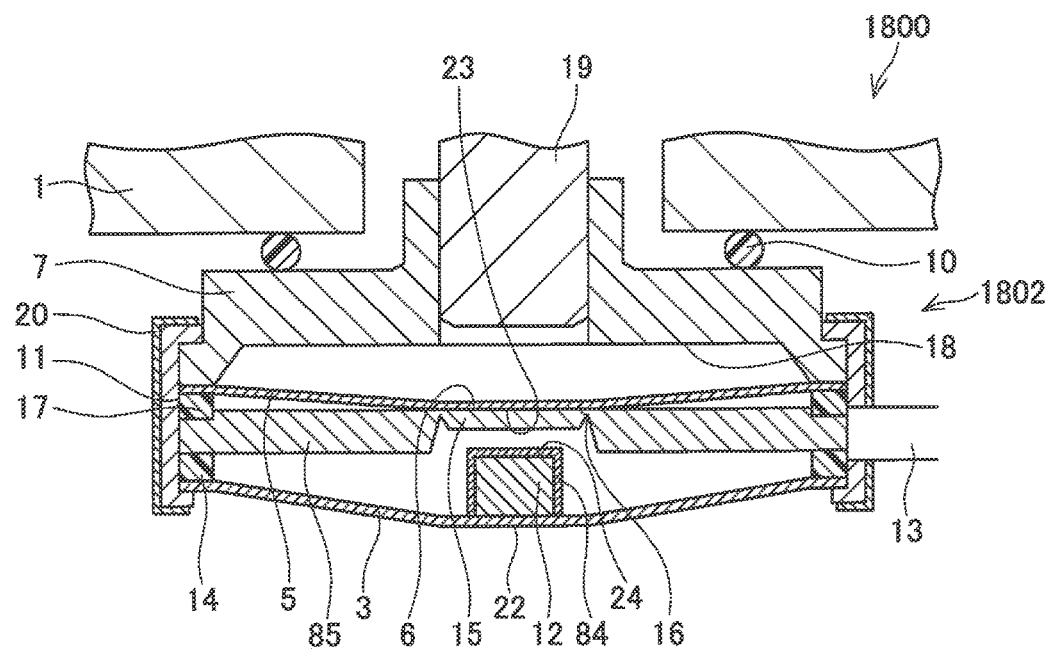
FIG. 22 shows a longitudinal sectional view of a current interruption device of an electric storage device of an eighteenth embodiment.

In the current interruption device 1802, as shown in FIG. 22, a conducting plate 85 differs in shape from the conducting plate 4 of the electric storage device 1700. In the conducting plate 85, an area surrounded by the breakable groove 16 is recessed relative to an outer side of the breakable groove 16. That is, in the conducting plate 85, the breakable groove 16 defines a center portion (thin portion) of the conducting plate 85. In the case of the current interruption device 1802, when the deforming plate 3 moves upward, the conducting plate 85 is located near a side face of the cap 84. Therefore, even if the cap 84 will come off the projection 12 due to the impact of the projection 12 coming into contact with the conducting plate 85, the cap 84 collides with a peripheral portion of the conducting plate 85 (outer side of the breakable groove 16). This makes it possible to prevent the cap 84 from coming off the projection 12.

Nineteenth Embodiment

An electric storage device 1900 is described with reference to FIG. 23. The electric storage device 1900 is a modification of the electric storage device 1700, and a current interruption device 1902 differs in structure from the current interruption device 1702 of the electric storage device 1700. Members of the electric storage device 1900 that are the same as those of the electric storage device 1700 are given the same reference signs as those of the electric storage device 1700, and as such, may not be described.

Figure 23:
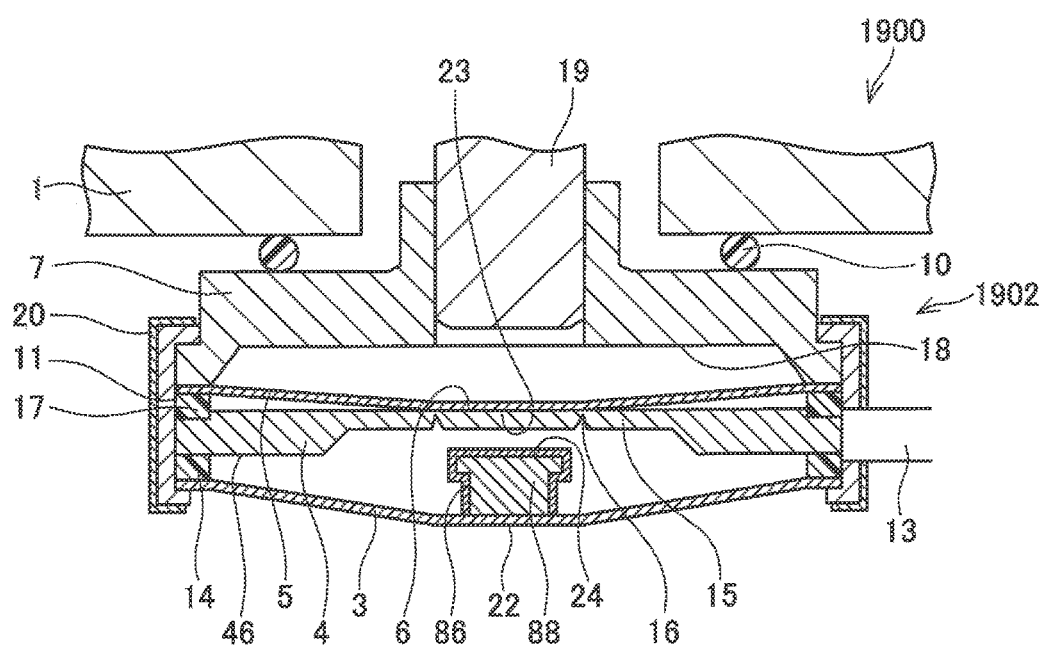
FIG. 23 shows a longitudinal sectional view of a current interruption device of an electric storage device of a nineteenth embodiment.

In the current interruption device 1902, as shown in FIG. 23, a projection 88 and a cap 86 differ in shape from their counterparts of the current interruption device 1700. An end portion of the projection 88 that faces the conducting plate 4 is larger in diameter than other portions. A shape of the cap 86 has the same feature as a shape of the projection 88. That is, in a portion of the cap 86 that covers the projection 88, an end portion of the cap 86 that faces the conducting plate 4 is larger in diameter than other portions. In the current interruption device 1902, the cap 86 can be prevented from coming off the projection 86 by vibration and/or by heat generated within the casing 1.

Twentieth Embodiment

Figure 24A:
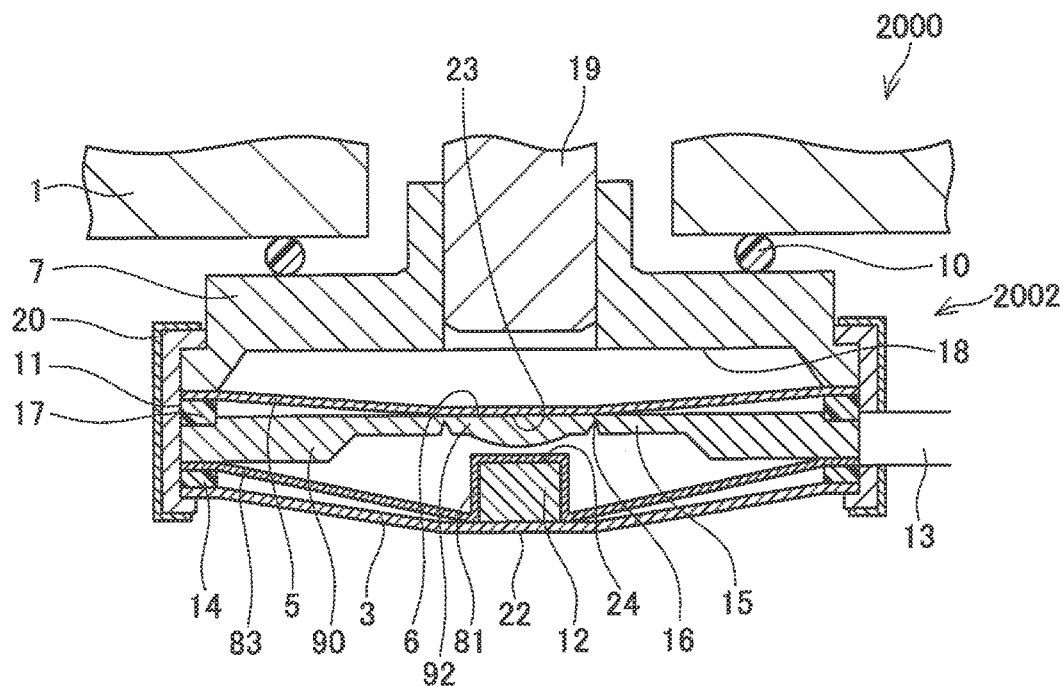
FIG. 24A shows a condition at normal times of a current interruption device of an electric storage device of a twentieth embodiment.
Figure 24B:
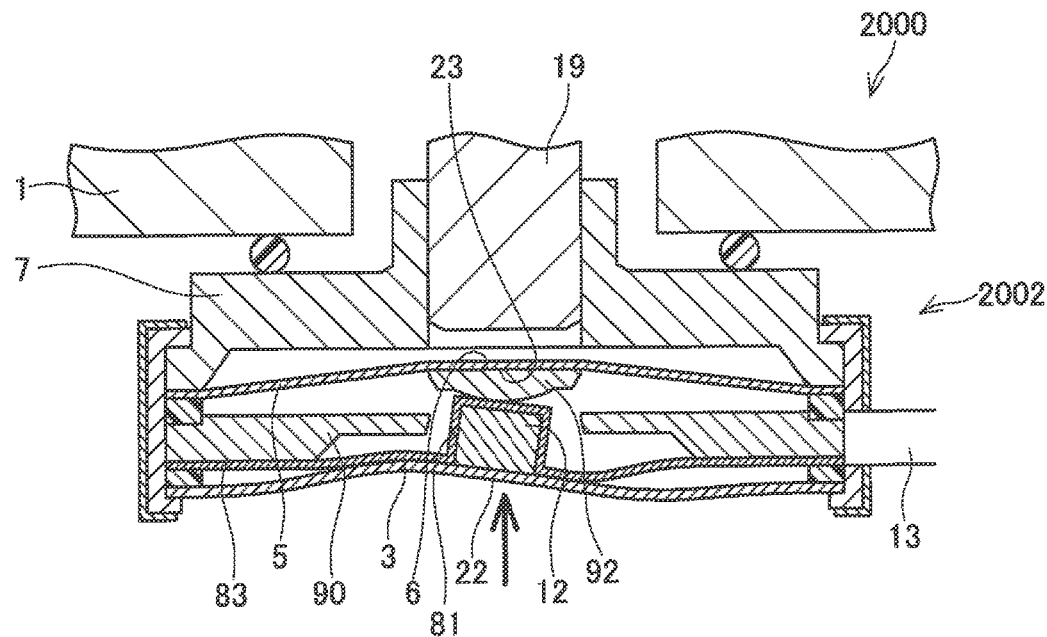
FIG. 24B shows a condition in which a current path is broken in the current interruption device of the electric storage device of the twentieth embodiment.

An electric storage device 2000 is described with reference to FIGS. 24A and 24B. The electric storage device 2000 is a modification of the electric storage device 1600, and a current interruption device 2002 differs in structure from the current interruption device 1602 of the electric storage device 1600. Members of the electric storage device 2000 that are the same as those of the electric storage device 1600 are given the same reference signs as those of the electric storage device 1600, and as such, may not be described. FIG. 24A shows a condition prior to breakage of a current path, and FIG. 24B shows a condition subsequent to breakage of the current path.

In the current interruption device 2002, as shown in FIG. 24A, a conducting plate 90 differs in shape from the conducting plate 4 of the current interruption device 1602. The conducting plate 90 includes a projection portion 92 projecting toward the projection 12. The projecting portion 92 is disposed on an inner side of the breakable groove 16. The projecting portion 92 has a curved, specifically arc-shaped, cross-section. In the case of the current interruption device 2002, as shown in FIG. 24B, even if the projection 12 obliquely makes contact with the conducting plate 90 via the cap Si, an impact can be added to substantially a center of the projecting portion 92. Therefore, when the inner pressure of the casing 1 rises, the conducting plate 90 is surely broken, so that the current path gets interrupted.

Twenty-First Embodiment

Figure 25A:
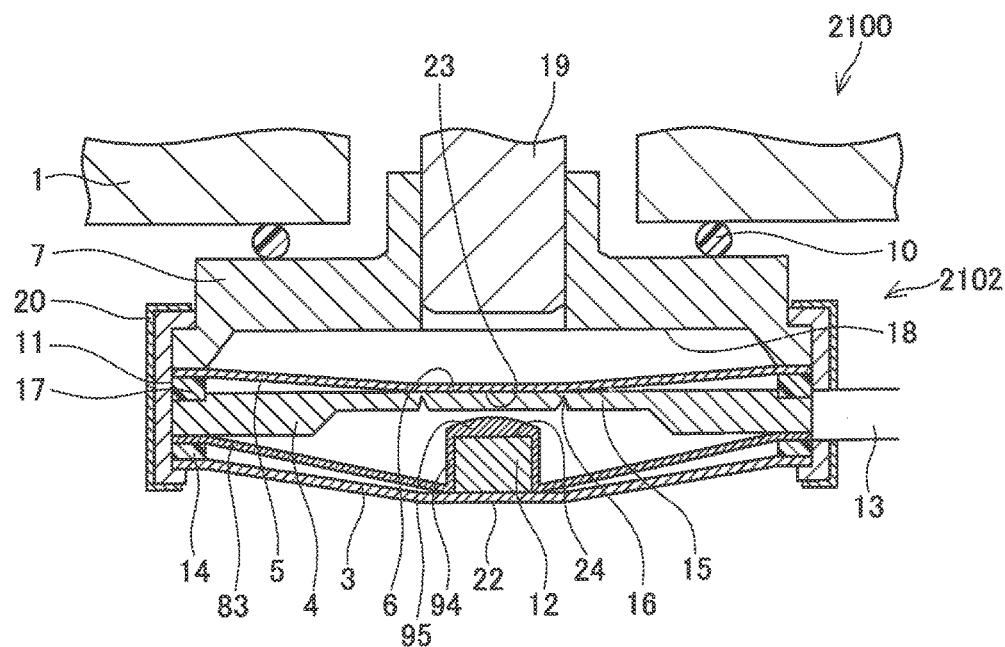
FIG. 25A shows a condition at normal times of a current interruption device of an electric storage device of a twenty-first embodiment.
Figure 25B:
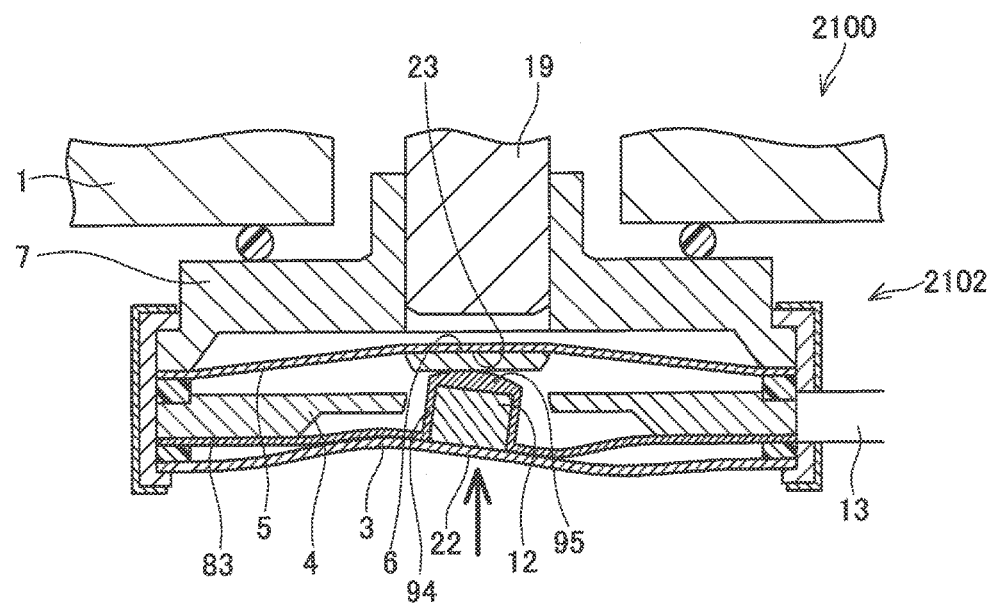
FIG. 25B shows a condition in which a current path is broken in the current interruption device of the electric storage device of the twenty-first embodiment.

An electric storage device 2100 is described with reference to FIGS. 25A and 253. The electric storage device 2100 is a modification of the electric storage device 1600, and a current interruption device 2102 differs in structure from the current interruption device 1602 of the electric storage device 1600. Members of the electric storage device 2100 that are the same as those of the electric storage device 1600 are given the same reference signs as those of the electric storage device 1600, and as such, may not be described. FIG. 25A shows a condition prior to breakage of a current path, and FIG. 25B shows a condition subsequent to breakage of the current path.

In the current interruption device 2102, as shown in FIG. 25A, a cap 94 differs in shape from the cap 81 of the current interruption device 1602. The cap 94 includes a projecting portion 95 projecting toward the conducting plate 4. The projecting portion 95 is located on an end face of the projection 12 that faces the conducting plate 4. The projecting portion 95 has a curved, specifically arc-shaped, cross-section. In the case of the current interruption device 2102, as shown in FIG. 25B, even if the projection 12 obliquely makes contact with the conducting plate 4 via the cap 94, an impact can be added to substantially a center of the conducting plate 4. Therefore, when the inner pressure of the casing 1 rises, the conducting plate 4 is surely broken, so that the current path gets interrupted. It should be noted that the shape of the projecting portion 95 needs only be a shape that becomes gradually narrower toward the conducting plate 4, and is not limited to an arc shape.

Twenty-Second Embodiment

Figure 26A:
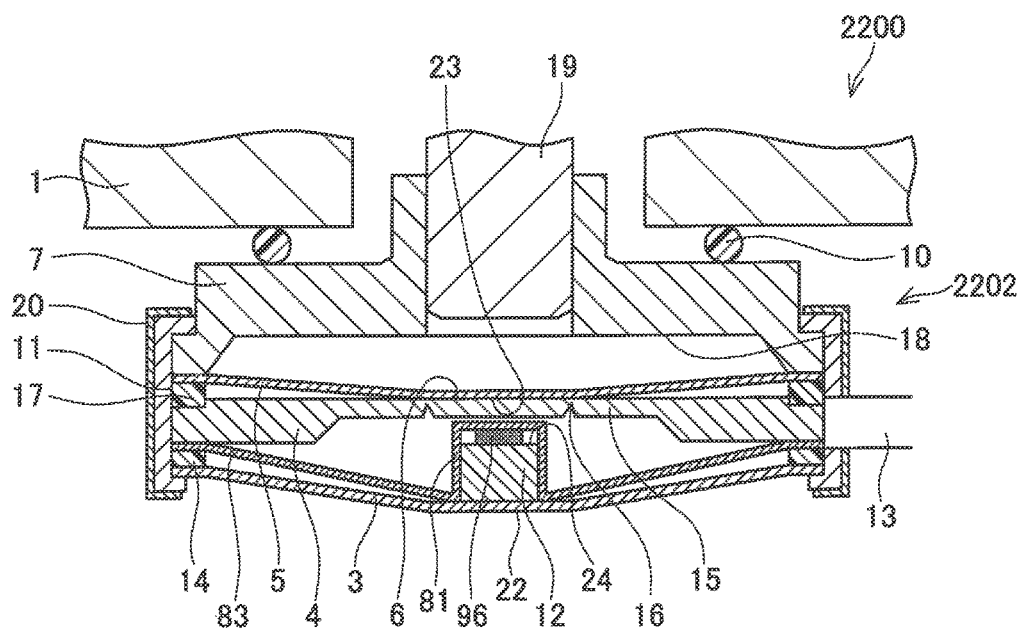
FIG. 26A shows a condition at normal times of a current interruption device of an electric storage device of a twenty-second embodiment.

An electric storage device 2200 is described with reference to FIGS. 26A and 26B. The electric storage device 2200 is a modification of the electric storage device 1600, and a current interruption device 2202 differs in structure from the current interruption device 1602 of the electric storage device 1600. Members of the electric storage device 2200 that are the same as those of the electric storage device 1600 are given the same reference signs as those of the electric storage device 1600, and as such, may not be described. FIG. 26A shows a condition prior to breakage of a current path, and FIG. 26B shows a condition subsequent to breakage of the current path.

In the current interruption device 2202, as shown in FIG. 26A, an insulating liquid 96 is disposed between the projection 12 and the cap 81. The insulating liquid 96 is disposed on an end face of the projection 12 that faces the conducting plate 4. The insulating liquid 96 is retained in a thin film, and before the deforming plate 3 deforms, the insulating liquid 96 is stored in a space between the projection 12 and the cap 81. It should be noted that although not illustrated, a minute hole is disposed in a portion of the cap 81 that is near the insulating liquid 96. It should be noted that an insulating fluid is made of any material that takes the form of a liquid at a temperature at which a battery works. Usable examples of the material for the insulating fluid include a solvent such as NMP, oils (e.g. those of plant oils and mineral oils which take the form of a liquid at a temperature at which a battery works), etc.

Figure 26B:
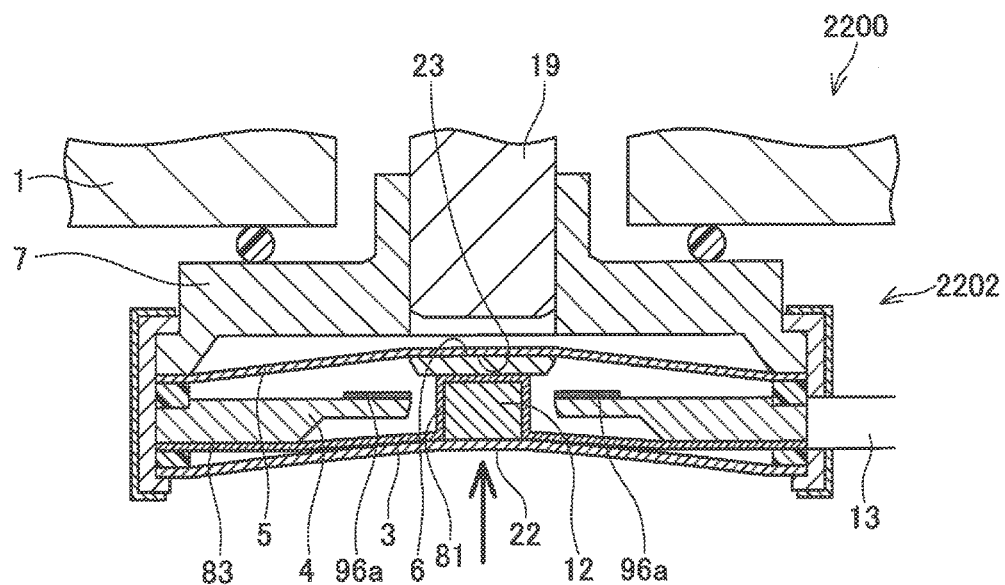
FIG. 26B shows a condition in which a current path is broken in the current interruption device of the electric storage device of the twenty-second embodiment.

As shown in FIG. 26B, when the deforming plate 3 deforms upward, the impact of the cap 81 making contact with the conducting plate 4 causes the space between the projection 12 and the cap 81 to become narrower. The insulating liquid 96 is discharged from within the cap 81 out of the cap 81 to form an insulating film 96a on the surface of the conducting plate 4. In the case of the current interruption device 2202, even when the contact plate 5 makes contact with the conducting plate 4 after interruption of the current path, the insulating film 96a can prevent the contact plate 5 and the conducting plate 4 from conducting with each other. That is, the electrode assembly 60 and the negative electrode external terminal 19 can be surely prevented from conducting again with each other after interruption of the current path.

Twenty-Third Embodiment

Figure 27:
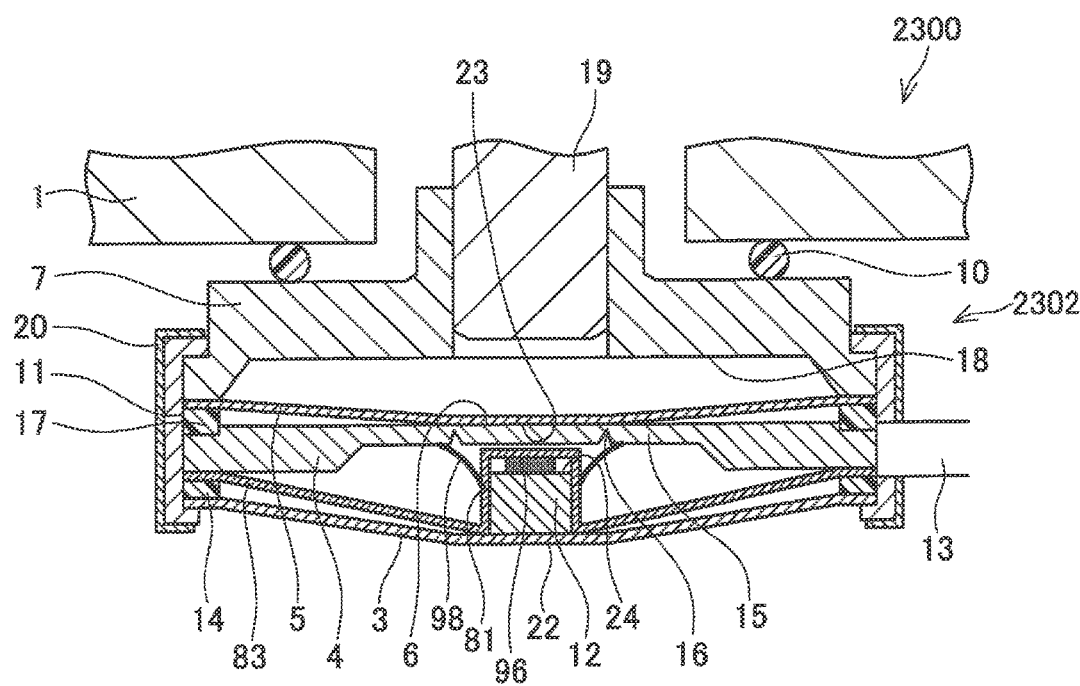
FIG. 27 shows a longitudinal sectional view of a current interruption device of an electric storage device of a twenty-third embodiment.

An electric storage device 2300 is described with reference to FIG. 27. The electric storage device 2300 is a modification of the electric storage device 2200, and a current interruption device 2302 differs in structure from the current interruption device 2202 of the electric storage device 2200. Members of the electric storage device 2300 that are the same as those of the electric storage device 2200 are given the same reference signs as those of the electric storage device 2200, and as such, may not be described.

In the current interruption device 2302, a thin plate 98 made of resin is disposed on a side wall of the cap 81. A lower side of the thin plate 98 (that faces the deforming plate 3) faces the projection via the side wall of the cap 81. An upper side of the thin plate 98 (that faces the conducting plate 4) is in contact with the conducting plate 4 on an outer side of the breakable groove 16. In the case of the current interruption device 2302, when the insulating liquid 96 is discharged out of the cap 81, the thin plate 98 can inhibit the insulating liquid 96 from moving toward the deforming plate 3. This makes it easy for an insulating film (see FIG. 26B) to be formed on the surface of the conducting plate 4, thus making it possible to more surely prevent the electrode assembly 60 and the negative electrode external terminal 19 from conducting again with each other.

Although the embodiments of the present invention have been described with reference to the drawings, the present invention is not limited in specific configuration to these embodiments, but encompasses modifications and additions that do not depart from the scope of the present invention.

For example, in each of the embodiments described above, an example is shown which includes an insulating deforming plate and an insulating projection disposed at a center portion of the deforming plate, and the projection projecting toward a contact plate. However, the contact plate and a conducting plate need only be kept electrically insulated from each other when an internal pressure of a casing rises to cause the deforming plate to deform to cause a current path to be broken. For example, instead of the insulating projection being disposed, the deforming plate may be made entirely of an insulating material. Alternatively, only portions of the projection that make contact with the contact plate and the conducting plate may be made of an insulating material.

In each of the embodiments described above, an example is shown where the deforming plate and/or the contact plate are/is configured by a thin plate(s) made of metal, e.g. a diaphragm(s) made of metal. However, the deforming plate may be made of an elastically deformable material having an insulation property. Further, the contact plate may be made of an elastically deformable material having a conduction property.

Further, the deforming plate may be made of a same material as the negative electrode (negative electrode collector). Conventionally, as a material for the deforming plate, a material for the positive electrode (positive electrode collector), namely aluminum or titanium, has been used. Use of aluminum as the material for the deforming plate has presented such a problem as to cause the deforming plate to be weak in strength. Further, use of titanium as the material for the deforming plate has presented such a problem as to cause the deforming plate to be more expensive than use of aluminum. Furthermore, use of aluminum or titanium as the material for the deforming plate could cause the deforming plate to deteriorate by creeping due to a rise in temperature inside a cell, a change in internal pressure of the casing, or the like. Deterioration of the deforming plate could cause the current interruption device to get activated when the internal pressure of the casing 1 rises but does not exceed the predetermined value while the electric storage device is normally working. That is, deterioration of the deforming plate could cause the current interruption device to get activated at a pressure that is lower than a pressure at which the current interruption device is originally supposed to get activated.

Such problems as these can be solved by using, as the material for the deforming plate, the same material as the negative electrode (negative electrode collector). It should be noted that an example of a material for the negative electrode is a copper-based material or stainless steel. Further, the term "same material as the negative electrode" is not intended to mean only completely a same material (or pure copper) as the negative electrode. For example, the term also encompasses an alloy or the like composed mainly of copper, i.e. the material for the negative electrode, and containing another element.

Further, in a case where the deforming plate is made of a weldable copper-based material or stainless steel, it is preferable that the projection be formed to have an insulation property. It should be noted that as the material for the deforming plate, iron, nickel, or the like can be used, as well as a copper-based material or stainless steel.

The current interruption device may be disposed on the current path between the positive electrode external terminal 119 and the electrode assembly 60. However, as stated in each of the embodiments described above, it is more preferable that the current interruption device be disposed on the current path between the negative electrode external terminal 19 and the electrode assembly 60. In the case of an electrode assembly formed by joining a positive electrode and a negative electrode on top of each other, it is usual, in general, that the negative electrode is made larger than the positive electrode for the prevention of the precipitation of Li. Therefore, in a case where the distance between the electrode assembly 60 and the current interruption device is made shorter, there is a possibility that the current interruption device and the negative electrode may contact with each other.

When disposed on the current path between the positive electrode external terminal 119 and the electrode assembly 60, the current interruption device may make contact with the negative electrode while at a positive potential, so that there is a risk of forming a short circuit. By disposing the current interruption device on the current path between the negative electrode external terminal 19 and the electrode assembly 60, such a short circuit can be prevented. It should be noted that as mentioned above, since the deforming plate 3 and the contact plate 5 are made of the same material as the negative electrode, it is easy to join (e.g. weld) the negative electrode and the current interruption device to each other. As a result, generation of corrosion caused by joining different types of metal to each other can be reduced.

In each of the embodiments described above, the projection of the deforming plate has a cylindrical shape. However, the projection may have another shape such as a conical shape.

In each of the embodiments described above, the projection is configured to make contact with the conducting plate or the contact plate. However, the projection may be configured to make contact both the conducting plate and the contact plate.

In each of the embodiments described above, the conducting plate appears to have its center portion formed thin when seen in longitudinal sectional view. Further, the breakable groove is formed in a thin portion of the center portion of the conducting plate. However, the conducting plate may have a uniform thickness, and the breakable groove may be formed at the center portion of the conducting plate.

In each of the embodiments described above, the conducting plate includes a connection member disposed at one end of an outer circumference portion thereof, the connecting member being electrically connected to the electrode assembly. However, without being limited to the embodiments described above, there needs only be a configuration in which the conducting plate and the electrode assembly are electrically connected to each other.

In each of the embodiments described above, the contact plate may be provided with a hole. When a space surrounded by the contact plate and the conducting plate is sealed, upward depression of the conducting plate by the deforming plate causes a reaction force to be generated in the deforming plate from the conducting plate. This may require a great deal of force for breaking the conducting plate. When the contact plate is provided with a hole, the space does not make resistance when the deforming plate depresses the conducting plate upward. This allows the deforming plate to more surely break the conducting plate.

The invention claimed is:

1. A current interruption device configured to electrically connect a positive electrode external terminal extending through a hole formed on a casing and an electrode assembly comprising a positive electrode and a negative electrode, or to connect a negative electrode external terminal extending through another hole formed on the casing and the electrode assembly, and to interrupt a current path of the positive electrode external terminal and the electrode assembly, or a current path of the negative electrode external terminal and the electrode assembly, when an internal pressure of an internal casing space accommodating the electrode assembly rises above a predetermined level, the current interruption device being disposed in the internal casing space, the current interruption device comprising:

a deforming plate configured to deform when the internal pressure of the internal casing space rises above the predetermined level;
a conducting plate which configures the current path; and
a contact plate, wherein the contact plate is a diaphragm,
wherein the conducting plate includes a first contact portion configured to contact the contact plate,
the contact plate includes a second contact portion configured to contact the first contact portion,
the first contact portion and the second contact portion are disposed on the current path,
the deforming plate includes a pressure receiving portion configured to receive the internal pressure of the internal casing space and a contacting portion configured to contact at least one of the first contact portion and the second contact portion, the first contact portion and the second contact portion are configured to be separated from the conducting plate by deformation of the deforming plate causing the contacting portion to move toward the contact plate, the first contact portion and the second contact portion overlap and contact each other at a center portion of the current interruption device, in a direction perpendicular to the conducting plate, both before and after the first contact portion and the second contact portion are separated from the conducting plate, the deforming plate is insulated from at least one of the conducting plate and the contact plate and disposed such that the deforming plate configures an outer face of the current interruption device to isolate the conducting plate and the contact plate from a space portion where the electrode assembly is accommodated which is outside of the current interruption device in the internal casing space, and the conducting plate is disposed to be interleaved between the deforming plate and the contact plate.

2. The current interruption device according to claim 1, wherein
the first contact portion is disposed at a center portion of the conducting plate and the second contact portion is disposed at a center portion of the contact plate.

3. The current interruption device according to claim 1, wherein a projection projecting toward the contact plate is disposed at a center portion of the deforming plate, and the contacting portion is included in the projection.

4. The current interruption device according to claim 3, wherein
the current interruption device is configured to shift among a first condition, a second condition and a third condition,
in the first condition a gap is provided between the deforming plate and the conducting plate during when the internal pressure of the casing is below the predetermined level,
in the second condition the contact plate is separated from the conducting plate by the projection of the deforming plate moving toward the conducting plate and adding an impact to the contact plate when the internal pressure of the casing rises above the predetermined level,
in the third condition a force of the contact plate moving toward the conducting plate and a force of the deforming plate separating the contact plate from the conducting plate are balanced, and
in the third condition the contact plate is separated from the conducting plate so as not to conduct with the conducting plate.

5. The current interruption device according to claim 3, further comprising:
an insulating cap covering the projection.

6. The current interruption device according to claim 5, wherein the cap includes a guide portion that is supported with an outer circumference portion of the conducting plate.

7. The current interruption device according to claim 5, wherein
a groove surrounds an entire periphery of a portion with which the contacting portion makes contact, and
an area surrounded by the groove is recessed relative to a surface of the conducting plate on an outer side of the groove.

8. The current interruption device according to claim 1, wherein
a groove is disposed around a center portion of the conducting plate around a portion with which the contacting portion is to make contact.

9. The current interruption device according to claim 8, wherein
the deforming plate is an inverting plate, and
an elastic force that inverts the deforming plate is larger than a force that breaks the groove of the conducting plate.

10. The current interruption device according to claim 8, wherein
an area surrounded by the groove of the conducting plate is recessed toward an opposite side of the deforming plate than a surface positioned at an outer side of the groove of the conducting plate.

11. The current interruption device according to claim 1, further comprising:
an insulating member having an insulation property disposed between the deforming plate and the conducting plate.

12. The current interruption device according to claim 1, wherein
a recess is disposed at a center portion of the conducting plate on a deforming plate side.

13. The current interruption device according to claim 1, wherein
a fragile portion is disposed around the second contact portion of the contact plate, the fragile portion being more fragile than other portions of the contact plate.

14. The current interruption device according to claim 13, wherein
an interspacing portion is disposed between an outer circumference portion of the contact plate and the second contact portion, a distance from the interspacing portion to the conducting plate being increased from the outer circumference portion toward a center portion of the contact plate, and
the fragile portion is disposed on the interspacing portion.

15. The current interruption device according to claim 1, wherein
a periphery of the first contact portion on a surface of the conducting plate on a contact plate side is recessed.

16. The current interruption device according to claim 1, wherein
the deforming plate and the contact plate are configured by thin plates.

17. The current interruption device according to claim 16, wherein
the deforming plate is configured by a thin plate having an arc-shaped wavy portion, and
the contact plate is configured by a flat thin plate.

18. The current interruption device according to claim 16, wherein
the deforming plate is configured by a flat thin plate, and
the contact plate is configured by a thin plate having an arc-shaped wavy portion.

19. The current interruption device according to claim 1, wherein
a through-hole configured to allow the contacting portion to pass through is disposed at a center portion of the conducting plate.

20. The current interruption device according to claim 1, wherein a pressure hole configured to exert a pressure change caused by the deformation of the deforming plate on the contact plate is disposed on the conducting plate.

21. The current interruption device according to claim 1, further comprising:
a conductive sealing cover body provided so as to cover an outer side of the contact plate, wherein the sealing cover body is screw-fixed to the positive electrode external terminal or to the negative electrode external terminal.

22. The current interruption device according to claim 1, further comprising:
a conductive sealing cover body provided so as to cover an outer side of the contact plate, wherein the sealing cover body is connected to the positive electrode external terminal or to the negative electrode external terminal via a connecting member.

23. The current interruption device according to claim 1, wherein
the current interruption device interrupts the current path of the negative electrode external terminal and the electrode assembly, and the current interruption device is disposed on the current path formed between the negative electrode external terminal and the electrode assembly.

24. The current interruption device according to claim 1, wherein
the deforming plate is made of a same material as the negative electrode.

25. An electric storage device comprising:
the current interruption device according to claim 1.

26. The electric storage device according to claim 25, wherein
the electric storage device is a secondary battery.

27. The current interruption device according to claim 1, wherein the internal casing space is sealed from an outside of the casing by being sealed between the casing and the positive electrode external terminal or between the casing and the negative electrode external terminal.

28. A current interruption device comprising:
a deforming plate configured to deform when an internal pressure of an internal casing space rises above a predetermined level;
a projection located on a center portion of the deforming plate;
a conducting plate comprising a first contact portion;
a contact plate that is substantially parallel to the conducting plate, wherein the contact plate comprises a second contact portion, and wherein the contact plate is a diaphragm;
wherein the conducting plate and the contact plate are electrically connected when the internal pressure of the internal casing space is below the predetermined level;
wherein the deforming plate and the projection are configured to separate the conducting plate and the contact plate when the internal pressure of the internal casing space rises above the predetermined level, so that the conducting plate and the contact plate are not electrically connected;
wherein the deforming plate is insulated from at least one of the conducting plate and the contact plate and disposed such that the deforming plate forms a first outer face of the current interruption device;
wherein the first contact portion and the second contact portion overlap and contact each other at a center portion of the current interruption device, in a direction perpendicular to the conducting plate, both before and after the conducting plate is separated from the contact plate, and
a cover body that encloses a chamber accommodating the conducting plate and the contact plate and forms a second outer face of the current interruption device that opposes the first outer face.

29. The current interruption device according to claim 28, wherein the current interruption device is sealed so that external gas cannot circulate into the current interruption device.

30. A current interruption device comprising:
a deforming plate configured to deform when an internal pressure of an internal casing space rises above a predetermined level;
a projection located on a center portion of the deforming plate, wherein the deforming plate includes the projection both before and after deforming as a result of the internal pressure of the internal casing space rising above the predetermined level;
a conducting plate comprising a first contact portion;
a contact plate that is substantially parallel to the conducting plate, wherein the contact plate comprises a second contact portion, and wherein the contact plate is a diaphragm;
wherein the conducting plate and the contact plate are electrically connected when the internal pressure of the internal casing space is below the predetermined level;
wherein the deforming plate and the projection are configured to separate the conducting plate and the contact plate when the internal pressure of the internal casing space rises above the predetermined level, so that the conducting plate and the contact plate are not electrically connected;
wherein the deforming plate is insulated from at least one of the conducting plate and the contact plate and disposed such that the deforming plate forms a first outer face of the current interruption device;
wherein the first contact portion and the second contact portion overlap and contact each other at a center portion of the current interruption device, in a direction perpendicular to the conducting plate, both before and after the conducting plate is separated from the contact plate, and
a cover body that encloses a chamber accommodating the conducting plate and the contact plate and forms a second outer face of the current interruption device that opposes the first outer face.

31. The current interruption device according to claim 30, wherein the projection has a column shape that extends toward the conducting plate.

* * * * *